United States Patent
Okabe et al.

(10) Patent No.: US 6,822,764 B1
(45) Date of Patent: *Nov. 23, 2004

(54) COMMUNICATION TERMINAL WITH AN ENERGY SAVING CAPABILITY

(75) Inventors: Shohji Okabe, Kanagawa-ken (JP); Shigeru Katsuragi, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 854 days.

This patent is subject to a terminal disclaimer.

(21) Appl. No.: 09/677,790

(22) Filed: Oct. 2, 2000

Related U.S. Application Data

(63) Continuation-in-part of application No. 08/837,671, filed on Apr. 22, 1997, now Pat. No. 6,128,104.

(30) Foreign Application Priority Data

Apr. 23, 1996 (JP) .............................................. 8-123974

(51) Int. Cl.$^7$ .............................. H04N 1/32; H04N 1/30
(52) U.S. Cl. ....................................... 358/442; 358/434
(58) Field of Search .................................. 358/442, 434, 358/437, 468, 1.14; 713/300, 320, 321, 323

(56) References Cited

U.S. PATENT DOCUMENTS

| | | | |
|---|---|---|---|
| 5,471,621 A | 11/1995 | Ohtsuki ...................... 713/323 |
| 5,758,040 A | 5/1998 | Ichimura et al. ............ 358/1.14 |
| 5,764,864 A | 6/1998 | Sujita ......................... 358/1.14 |
| 6,128,104 A | * 10/2000 | Okabe et al. ................ 358/442 |

FOREIGN PATENT DOCUMENTS

| | | | |
|---|---|---|---|
| JP | 57-168573 | 10/1982 | ............ H04N/1/00 |
| JP | 1-114253 | 5/1989 | ............ H04M/1/00 |
| JP | 4-92563 | 3/1992 | ............ H04N/1/23 |
| JP | 4-92564 | 3/1992 | ............ H04N/1/23 |
| JP | 4-274288 | 9/1992 | |
| JP | 5-110726 | 4/1993 | ............ H04N/1/00 |
| JP | 5-260229 | 10/1993 | ............ H04N/1/00 |
| JP | 7-87251 | 3/1995 | ............ H04N/1/00 |
| JP | 7-98553 | 4/1995 | .......... G03G/15/20 |

\* cited by examiner

Primary Examiner—Leo Boudreau
Assistant Examiner—Duy M. Dang
(74) Attorney, Agent, or Firm—Cooper & Dunham LLP

(57) ABSTRACT

A facsimile apparatus of the present invention and having an energy saving function includes an auxiliary controller or subcontroller for managing the conditions of the apparatus. While the subcontroller is in operation, a time manager manages the duration of the stand-by state of the apparatus and feeds time information to the subcontroller. A main controller delivers, before the stand-by state, a specified cancelling time for cancelling the stand-by state to the subcontroller. In the stand-by state, the subcontroller compares the time information and specified cancelling time. When the specified cancelling time is reached, the auxiliary controller cancels the stand-by state and causes power to be fed to the main controller and preselected units.

15 Claims, 16 Drawing Sheets

COMMUNICATION TERMINAL WITH AN ENERGY SAVING CAPABILITY

The present invention is a continuation-in-part of U.S. application Ser. No. 08/837,671, filed Apr. 22, 1997, U.S. Pat. No. 6,128,104.

BACKGROUND OF THE INVENTION

The present invention relates to a communication terminal having an energy saving function and capable of managing time even in an energy saving mode. More particularly, the present invention relates to a facsimile apparatus with an energy saving function and capable of performing, e.g., time appointed transmission even in an energy saving mode.

Various kinds of apparatuses available today have an energy saving feature for reducing power consumption. Particularly, a facsimile apparatus belonging to a family of communication terminals is required to save power while in a stand-by state, and is provided with an energy saving function. Japanese Patent Laid-Open Publication No. 57-168573, for example, discloses a facsimile apparatus including a main controller and a subcontroller implemented by CPUs (Central Processing Units). The main controller is supplied with power from a main power source during transmission and receipt. The subcontroller is supplied with power from an auxiliary power source while the apparatus is in a stand-by state. In the stand-by state, only the auxiliary power source is held operative in order to save power.

Japanese Patent Laid-Open Publication No. 1-119813 teaches a facsimile apparatus in which a main power source is turned on when a call signal coming in through a communication circuit is detected, thereby reducing power consumption. Further, Japanese Patent Laid-Open Publication No. 3-105408 proposes an electronic apparatus so constructed as to interrupt a clock while preselected control processing is not required.

It is a common practice with the conventional facsimile apparatus having an energy saving function to assign a time managing function to the main controller. Specifically, the main controller controls the operation of various functions needing time management, e.g., time appointed polling receipt, time appointed transmission, power saving timer, and night timer. However, the auxiliary controller also included in the apparatus lacks the function of managing time. This, coupled with the fact that the main power source for feeding power to preselected units including the main controller is turned off in an energy saving mode, makes it impossible to manage time in the energy saving mode. Therefore, the conventional apparatus cannot, in the energy saving mode, control the operation of the various functions mentioned above.

With any one the conventional facsimile apparatuses, it is possible to cancel the energy saving mode in response to the operator's manipulation or a ringing signal or similar signal representative of receipt. However, because the apparatus lacks the function of managing time, it cannot execute control for cancelling the energy saving mode at a preselected time.

SUMMARY OF THE INVENTION

It is therefore an object of the present invention to provide a communication terminal capable of controlling, even in an energy saving mode, the operation of various functions needing time management, while saving power.

It is another object of the present invention to provide a communication terminal with an energy saving function and capable of cancelling its energy saving function at a preselected time.

In accordance with the present invention, a communication terminal having au energy saving function includes a main controller for controlling the entire terminal. An auxiliary controller manages, when the terminal is in a stand-by state, the conditions of the terminal in place of the main controller while power is not fed to the main controller. A time manager manages, while the auxiliary controller is in operation, a period of time elapsed in the stand-by state of the terminal, and feeds time information to the auxiliary controller. The main controller feeds, before the terminal enters the stand-by state, a specified cancelling time for cancelling the stand-by state to the auxiliary controller. The auxiliary controller compares, in the stand-by state, the time information and specified cancelling time and cancels, when the specified cancelling time is reached, the stand-by state to thereby start power supply to the main controller and preselected units.

Further, in accordance with the present invention, a power source control device having a power saving control capability includes a main power source. A timepiece reports that a specified time for a body, in which the power source control device is built, to perform a preselected operation has been reached. A specified time setting section sets the specified time on the timepiece. A power source controller causes, in response to a report from the timepiece and indicative of the specified time, the main power source having been inoperative to start feeding power.

Moreover, in accordance with the present invention, a communication terminal having a power saving control capability includes a timepiece for reporting that a specified time for performing a preselected operation has been reached. A pecified time setting section sets the specified time on the timepiece. A power source controller causes, in response to a report from the timepiece, the main power source having been inoperative to start feeding power.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Preferred embodiments of the communication terminal in accordance with the present invention will be described hereinafter. While each embodiment is implemented as a facsimile apparatus, the present invention is, of course, applicable to any other communication terminal and any kind of apparatus needing an energy saving feature.

1st Embodiment

Figure 1:
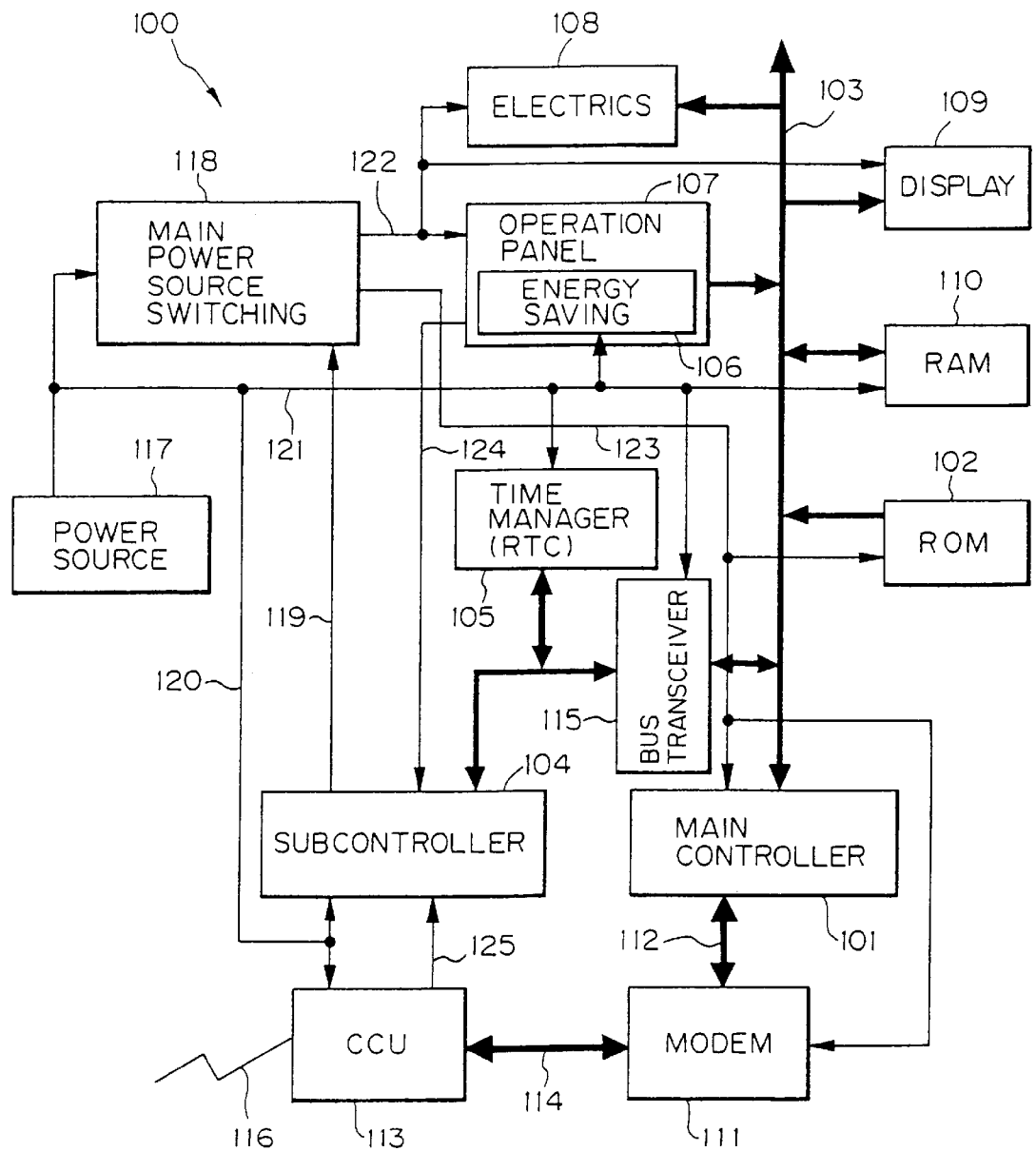
FIG. 1 is a block diagram schematically showing a first embodiment of the facsimile apparatus with an energy saving function in accordance with the present invention.

Referring to FIG. 1, a facsimile apparatus, generally 100, includes a main controller 101 and an auxiliary controller or subcontroller 104. The main controller or main control means 101 includes a CPU (Central Processing Unit) and controls the entire apparatus 100 via a bus line 103 on the basis of a program stored in a ROM (Read Only Memory) 102. The subcontroller or auxiliary control means 104 includes a CPU, ROM and RAM (Random Access Memory) and performs control while the apparatus 100 is in an energy saving mode. A time manager or time managing means 105 is connected to the main controller 101 via a bus transceiver 115 and connected to the subcontroller 104 via the bus line 103. The bus transceiver 115 separates the bus line 103, as will be described specifically later. The time manager 105 manages time, calender and other time information. An operation panel 107 is connected to the main controller 101 via the bus line 103 and includes an energy saving 106 to be manipulated by the operator. A transmission start/stop key, energy save key, on-hook key and other keys, not shown, are arranged on the operation panel 107. Electrics 108 is connected to the bus line 103 and includes a controller board and various kinds of adjusting switches and control units mounted on the controller board, although not shown specifically. A display 109 is connected to the bus line 103 in order to display time information as well as other information. A RAM 110 is connected to the main controller 101 via the bus line 103 and has a buffer memory area and a work area. The buffer memory area is used to store image data at the time of transmission or receipt. A modem 111 is connected to the main controller 101 via the bus line 112 in order to modulate an image data signal to be sent or to demodulate an image data signal received. A communication control unit (CCU) 113 is connected to the modem 111 via a bus line 114 and connected to a communication circuit 116 in order to control the transmission and receipt of image data. A power source 117 feeds power received from a commercially available power source to the entire apparatus 100. A main power source switching 118 turns off a main power source when an energy saving mode is to be set up.

It is to be noted that the RAM 110 stores time attribute data for time appointed polling receipt, time appointed transmission, power saving timer, night timer, etc. In addition, the RAM 110 includes an area for storing image data in the event of time appointed transmission.

The power source 117 is connected to the main controller 101, ROM 102, operation panel 107, electrics 108, display 109 and modem 111 via power lines 122 and 123 so as to feed power thereto via the main power source switching 118. When the energy saving mode is to be set up, the switching 118 is capable of shutting off the power supply to the above units in order to save power. Further, the power source 117 is connected to the subcontroller 104, CCU 113, time manager 105, energy saving 106, bus transceiver 115 and RAM 110 via power lines 120 and 121, feeding power directly thereto. This allows the units 104, 111, 105, 106, 115 and 110 to operate even during energy saving mode operation The switching 118 includes a MOS FET (Metal Oxide Semiconductor Field Effect Transistor), resistors, etc. The switching 118 is connected to the subcontroller 104 via a control line 119. On receiving a main power source control signal from the subcontroller 104 via the control line 119, the switching 118 selectively turns on or turns off the power supply to the main controller 101 and other associated units.

The main controller 101 delivers a main controller information signal to the subcontroller 104 via the bus line 103, informing the subcontroller 104 of the content of control. If the input information signal indicates the turn-off of the main power source, the subcontroller 104 feeds a main power source control signal to the switching 118 in order to turn off the main power source. The subcontroller 104 receives via an energy saving cancel signal line 124 the outputs of the start/stop key and energy save key of the energy saving 106, the output of the on-book key, the output of an S1 sensor, not shown, responsive to the setting of documents, etc. In addition, the subcontroller 104 receives via an energy saving cancel signal line 125 a ringing signal, 1,300 Hz facsimile network call signal, off-hook signal output from a telephone associated with the apparatus 100, etc. If the information input via the signal lines 124 and 125 show that the main power source should be turned on, the subcontroller 104 delivers the main power source control signal to the switching 118 in order to cause it to turn on the main power source. As a result, the apparatus 100 is allowed to operate in its normal mode as distinguished from the power saving mode.

In the illustrative embodiment, to save power while the apparatus 100 is in its waiting state, the main power source is turned off. This is only illustrative and may be replaced with any other suitable scheme so long as the subcontroller 104 independent of the main controller 101 performs control in the energy saving mode. For example, the oscillation clock frequency of the main controller 101 may be lowered.

The main controller 101 and subcontroller 104 interchange information in the form of the previously mentioned main controller information signal and a subcontroller information signal via the bus line 103. The main controller information signal output from the main controller 101 includes various kinds of information, e.g., the content of control meant for the subcontroller 104, appointed time information, and time counter information. The subcontroller information signal output from the subcontroller 104 includes various kinds of information, e.g., the time when the energy saving mode has been cancelled as well as the cause of cancellation. While the main controller 101 and subcontroller 104 are connected by the bus line 103, they may be connected by additional signal lines for the transfer of the above two signals.

The time manager 105 may be implemented by a so-called real-time clock (RTC) having various functions including a function of inputting and outputting time and calendar data either in series or in parallel. The time manager 105 is connected to the main controller 101 and subcontroller 104 by the bus line 103, delivering time and calendar information thereto. Of course, RTC may be replaced with any other suitable implementation so long as it can manage time, and may be built in the main controller 101 or subcontroller 104 in a one-chip configuration. The illustrative embodiment uses an exclusive parallel input/output RTC chip by way of example.

In the energy saving mode, the switching 118 turns off the main power source, as stated earlier. In this condition, the input and output terminals of the units powered by the main power source become indefinite, making the part of the bus line 103 connected to such units unable to operate. In the illustrative embodiment, the bus transceiver 115 separates the inoperable part of the bus line 103 and the operable part of the same. This allows the part of the bus line 103 connecting the units expected to interchange data in the energy saving mode to remain operable. Specifically, the bus transceiver 115 is inserted between the part of the bus line 103 connecting the time manager 105 and subcontroller 104 and the part of the same connecting the main controller 101 and units including the ROM 102. In the normal mode as distinguished from the energy saving mode, the bus transceiver 115 allows all the units connected to the bus line 103 to interchange data. On the other hand, in the energy saving mode, the bus transceiver 115 maintains only the part of the bus line 103 connecting the subcontroller 104 and time manager 105 operable.

If two bus lines exist in the time manager 105, the bus transceiver 115 may be omitted, in which case the bus lines will be connected between the units other than the subcontroller 104 and the time manager 105. Alternatively, another time manager may be added. In such a case, however, the main controller 101 and subcontroller 104 cannot interchange data via a bus line and need exclusive signal lines.

Figure 2:
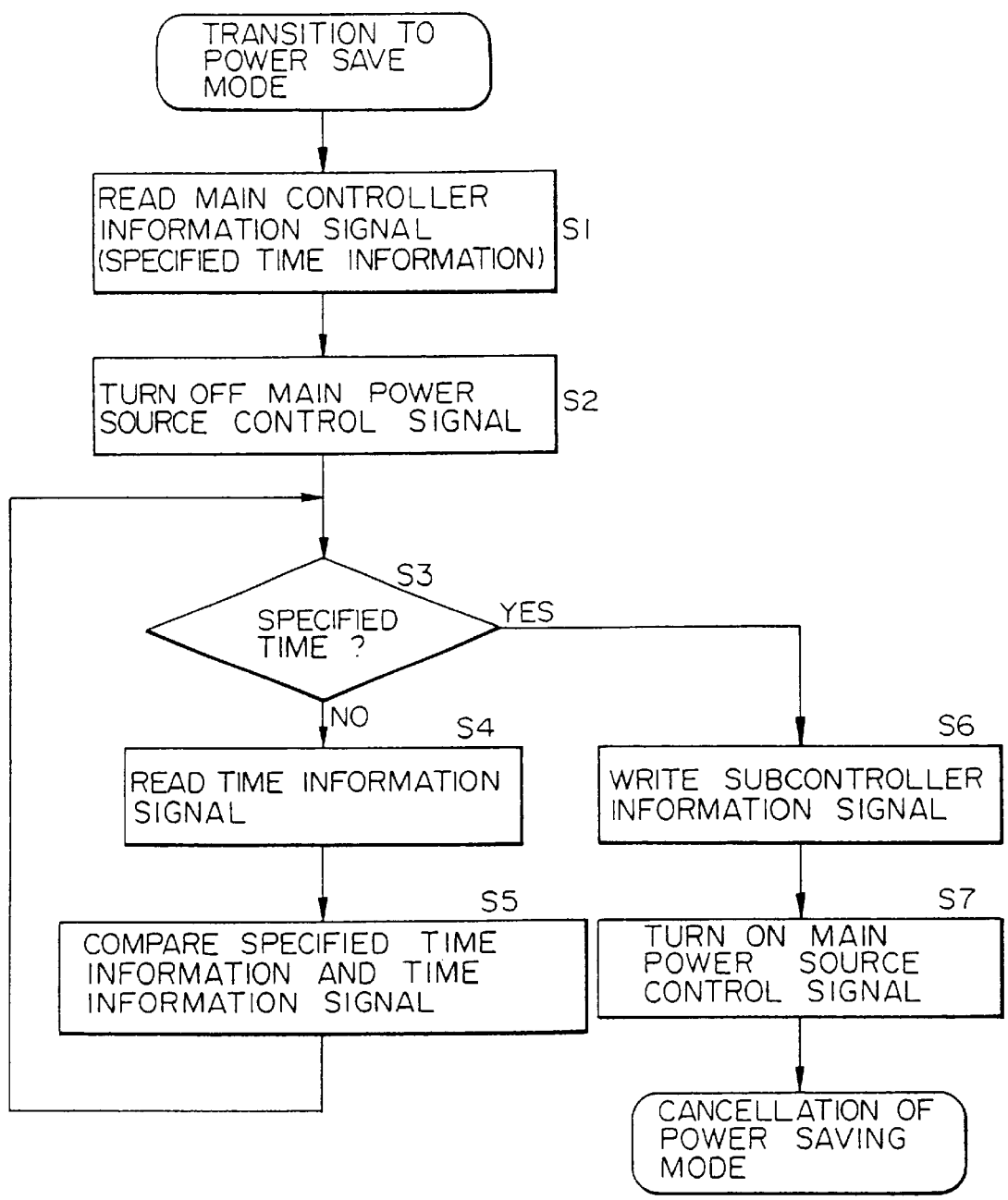
FIG. 2 is a flowchart demonstrating a specific operation of the first embodiment.

Reference will be made to FIG. 2 for describing a specific operation of the apparatus 100 to occur when the energy saving mode is set up. As shown, on detecting the transition from the normal mode to the energy saving mode, the subcontroller 104 receives the main control information signal output from the main controller 101, and reads specified time information out of the signal (step S1). The specified time information shows specified times relating to the control of the subcontroller 104, e.g., the time for cancelling the energy saving mode. In the following description, let the specified time information be indicative of the time for cancelling the energy saving mode by way of example.

The subcontroller 104 obtained the time for cancellation in the step S1 delivers the main power source control signal to the main power source switching 118 via the signal line 119. In response, the switching 118 turns off the main power source (step S2). As a result, the energy saving mode is set up. The previously stated alternative scheme, e.g., lowering the oscillation clock frequency of the main control 101 will also be effected in the step S2.

In the energy saving mode, the subcontroller 104 repeats the loop consisting of steps S3, S4 and S5. First, in the step S4, the subcontroller 104 reads the time information signal output from the time manager 105 via the line 103, and confirms the current time. The subcontroller 104 compares the current time information with the specified time information received from the main controller 101 (step S5). Then, the subcontroller 104 determines whether or not the current time is coincident with the time indicated by the specified time information (step S3).

If the answer of the step S3 is negative (No), the subcontroller 104 repeats the steps S4 and S5. If the answer of the step S3 is positive (Yes), the subcontroller 104 executes steps S6 and S7 for cancelling the energy saving mode. While the energy saving mode may be cancelled by a signal output from the energy saving 106 or from the CCU 113, as in the conventional facsimile apparatus, let the following description concentrate on the case wherein the energy saving mode is cancelled at the time specified by the main controller 101.

In the step S6, the subcontroller 104 delivers to the main controller 101 via the bus line 103 the subcontroller information signal showing the time when the energy saving mode has been cancelled, the cause of cancellation, etc. In response, the main controller 101 determines control to be executed next. In the step S7, the subcontroller 104 feeds the main power source control signal to the switching 118 via the signal line 119. In response, the switching 118 turns on the main power source and thereby cancels the energy saving mode.

It should be noted that the cancellation of the energy saving mode does not refer to causing the units of the entire apparatus 100 to escape from the energy saving mode, but refers to causing only the main controller 101 and other units necessary at the current stage of operation to escape from the above mode. This decision is made by the main controller 101 in response to the subcontroller information signal output from the subcontroller 104 in the step S6.

The above decision to be made by the main controller 101 will be described specifically. Assume that the energy saving mode should be cancelled at the time specified by the main controller 101 in order to effect time appointed transmission. Then, the subcontroller 104 delivers to the main controller 101 the subcontroller information signal including information showing that it has cancelled the energy saving mode for effecting time appointed transmission. In response, the main controller 101 executes control for time appointed transmission. This is a specific case wherein the main controller 101 and other units necessary at the current stage of operation escape from the energy saving mode. If desired, all the units of the apparatus 100 may escape from the energy saving mode in all the possible cases. During the above control, the main controller 101 does not show the time on the display 109 because in a time appointed transmission mode the operator does not operate the apparatus 100.

As stated above, in the illustrative embodiment, while the time manager 10 manages time, the subcontroller 104 compares current time information received from the time manager 105 and specified time information received from the main controller 101. Therefore, even when the main controller 101 managing time in the usual state has its power supply turned off, the functions needing time management, e.g., the time appointed polling receipt, time appointed transmission, power saving timer and night timer functions can be controlled by a simple arrangement. In addition, the conventional energy saving feature is achieved.

Further, the subcontroller 104 can manage time, and can therefore cancel the energy saving mode at any specified time on the basis of the current time information and specified time information received from the time manager 105 and main controller 101, respectively.

Moreover, when the subcontroller 104 cancels the energy saving mode, it delivers to the main controller 101 the subcontroller information signal indicative of the time and cause of cancellation of the energy saving mode. This allows the main controller 101 to execute control to follow the cancellation of the above mode smoothly.

2nd Embodiment

Figure 3:
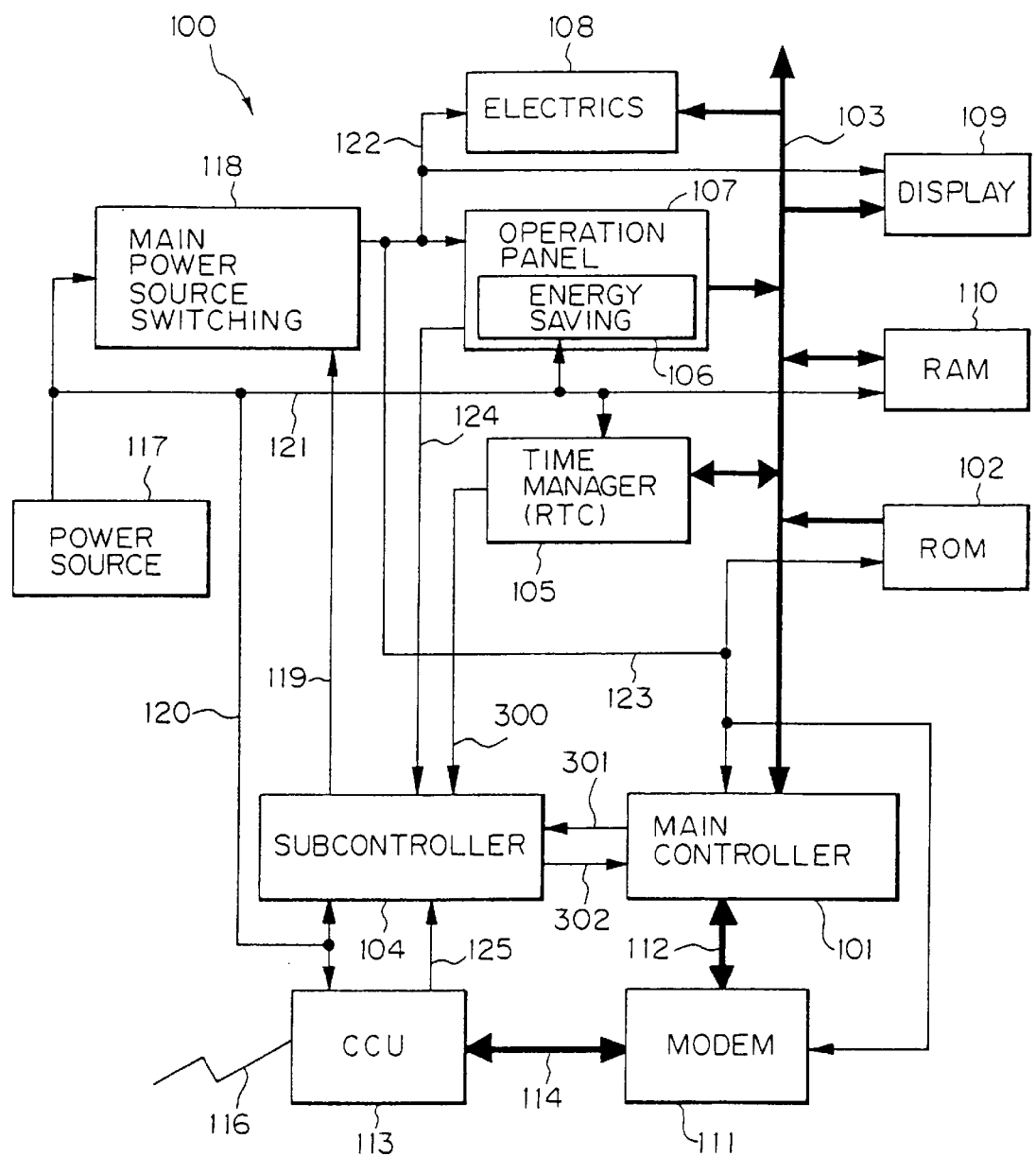
FIG. 3 is a block diagram schematically showing a second embodiment of the present invention.

Referring to FIG. 3, a second embodiment of the present invention is shown. In FIG. 3, blocks identical with the blocks shown in FIG. 1 are designated by identical reference numerals, and a detailed description thereof will not be made in order to avoid redundancy. As shown, the time manager 105 and subcontroller 104 are interconnected by a time period clock line 300. The time manager 105 has a function of outputting a time period clock at a period of, e.g., 1 minute or 1 second. In this embodiment, the bus transceiver 115, FIG. 1, is absent, so the main controller 101 is capable of receiving time information from the time manager 105 via the bus line 103 at all times. The main controller 101 controls via the bus line 103 the control over the time setting of the time manager 105, the output of a time interrupt signal, etc.

The main controller 101 and subcontroller 104 are interconnected by a main controller information signal line 301 and a subcontroller information signal line 302 because they do not need a bus line therebetween. A bus line may, of course, be provided between the main controller 101 and subcontroller 104, in which case the subcontroller 104 must be provided with a function of connecting the bus line.

Figure 4:
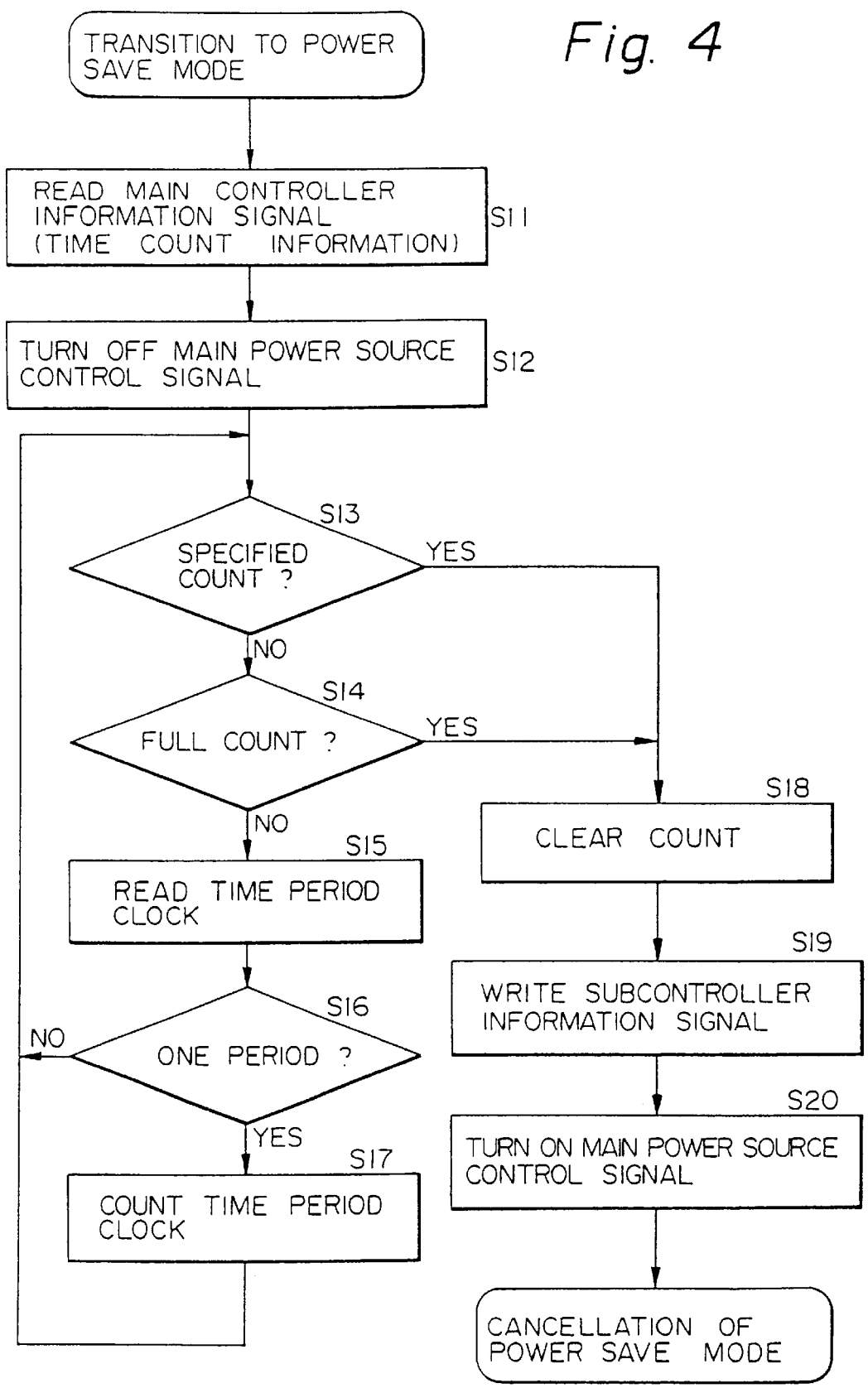
FIG. 4 is a flowchart demonstrating a specific operation of the second embodiment.

FIG. 4 shows a specific operation of this embodiment to occur on the transition to the energy saving mode. As shown, on detecting the transition to the energy saving mode, the subcontroller 104 reads time count information out of the main controller information signal output from the main controller 101 (step S11). The time count information refers to information showing in how many hours, minutes and seconds the energy saving mode should be cancelled, as counted from the current time. The main controller 101 or the subcontroller 104 determines the count on the basis of the time period clock output from the time manager 105.

After the subcontroller 104 has obtained the time count information from the main controller 101 in the step S11, it delivers the main power source control signal to the switching 118 via the signal line 119. In response, the switching 118 turns off the main power source (step S12), thereby setting up the energy saving mode.

In the energy saving mode, the subcontroller 104 repeats the loop consisting of steps S13–S17. Of course, any other control may be effected during this period of time. First, in the step S15, the subcontroller 104 reads the time period clock via the time period clock line 300. In the step S16, the subcontroller 104 determines whether or not a change of one period has occurred. The time period clock refers to a clock whose period is 1 minute or 1 second. For example, if the time period clock has a period of 1 minute, then the subcontroller 104 determines that a change of one period has occurred, every minute in the step S16. If the answer of the step S16 is Yes, the subcontroller 104 counts the time period clock (step S17) and then executes the step S13. If the answer of the step S16 is No, the subcontroller 104 executes the step S13 without counting the time period clock.

In the step S13, the subcontroller 104 determines whether or not the count of the time period clock output from the time manager 105 is coincident with the time count information output from the main. controller 101. If the answer of the step S13 is No, the subcontroller 104 determines whether or not the count of the time period clock has reached its full count (step S14). If the answer of the step S14 is No, the subcontroller 10 returns to the step 15.

If the answer of the step S14 is Yes, the subcontroller 104 executes a step S18. It is to be noted that the full count of the time period clock refers to the maximum count set in the subcontroller 104. In this case, the subcontroller 104 is unable to count the next time period clock. Therefore, the subcontroller 104 once cancels the energy saving mode (step S18), and informs the main controller 101 of the cancellation. The procedure to be executed at the time of the full count is the same as the procedure to be executed when the count of the time period clock output from the time manager 105 and the time count information output from the main controller 101 are coincident, as follows.

Assume that the count of the time period clock and the time count information are coincident (Yes, step S13). Then, the subcontroller 104 clears the count of the time period clock (step S18). Then, the subcontroller 104 delivers to the main controller 101 the subcontroller information signal including information showing the cause of cancellation of the energy saving mode, e.g., whether the cancellation is based on the specified count output from the main controller 101 or whether it is based on the full count. The subcontroller information signal may additionally include information showing the time when the cancellation has occurred.

Subsequently, the subcontroller 104 feeds the main power source control signal to the switching 118 via the signal line 119. In response, the switching 118 turns on the main power source and thereby cancels the energy saving mode (step S20).

Assume that the subcontroller 104 has cancelled the energy saving mode because the count of the time period clock has reached the full count Then, the operation panel 107, electrics 108 and display 109 are not necessary for the operation of the apparatus 100. Therefore, the power supply to such units 107–109 may be continuously shut off. This decision is made by the main controller 101 on the basis of the subcontroller information signal output from the subcontroller 104.

When the subcontroller 104 has cancelled the energy saving mode due to the full count, the main controller 101 outputs new time count information in the form of the main controller information signal. The subcontroller 104 receives the new time count information and again sets up the energy saving mode. This is followed by the procedure described with reference to FIG. 4.

As stated above, in this embodiment, the subcontroller 104 counts the time period clock output from the timer manager 105, and compares the count of the time period clock with time count information output from the main controller 101. Therefore, the functions needing time management can be controlled by a simpler configuration than in the first embodiment.

Further, the subcontroller 104 can manage time, and can therefore cancel the energy saving mode at a designated time on the basis of the count of the time period clock and the content of the time count information.

Moreover, even when the subcontroller 104 reaches the full count, it once causes the main controller 101 to escape from the energy saving mode, informs the main controller 101 of the full count, receives new time count information from the main controller 101, and again sets up the energy saving mode. This obviates an occurrence that the time management fails due to the full count.

In the first embodiment, to obtain the time information output from the timer manager 105, the subcontroller 104 must be provided with a bus line including a data bus, address bus and control bus or a serial signal line, and a parallel or serial port to be connected to the bus line or the serial signal line. This is apt to scale up the construction of the apparatus 100. By contrast, the second embodiment is practicable without resorting to the bus line or the like, and therefore has a smaller size and saves power more than the first embodiment.

3rd Embodiment

Figure 5:
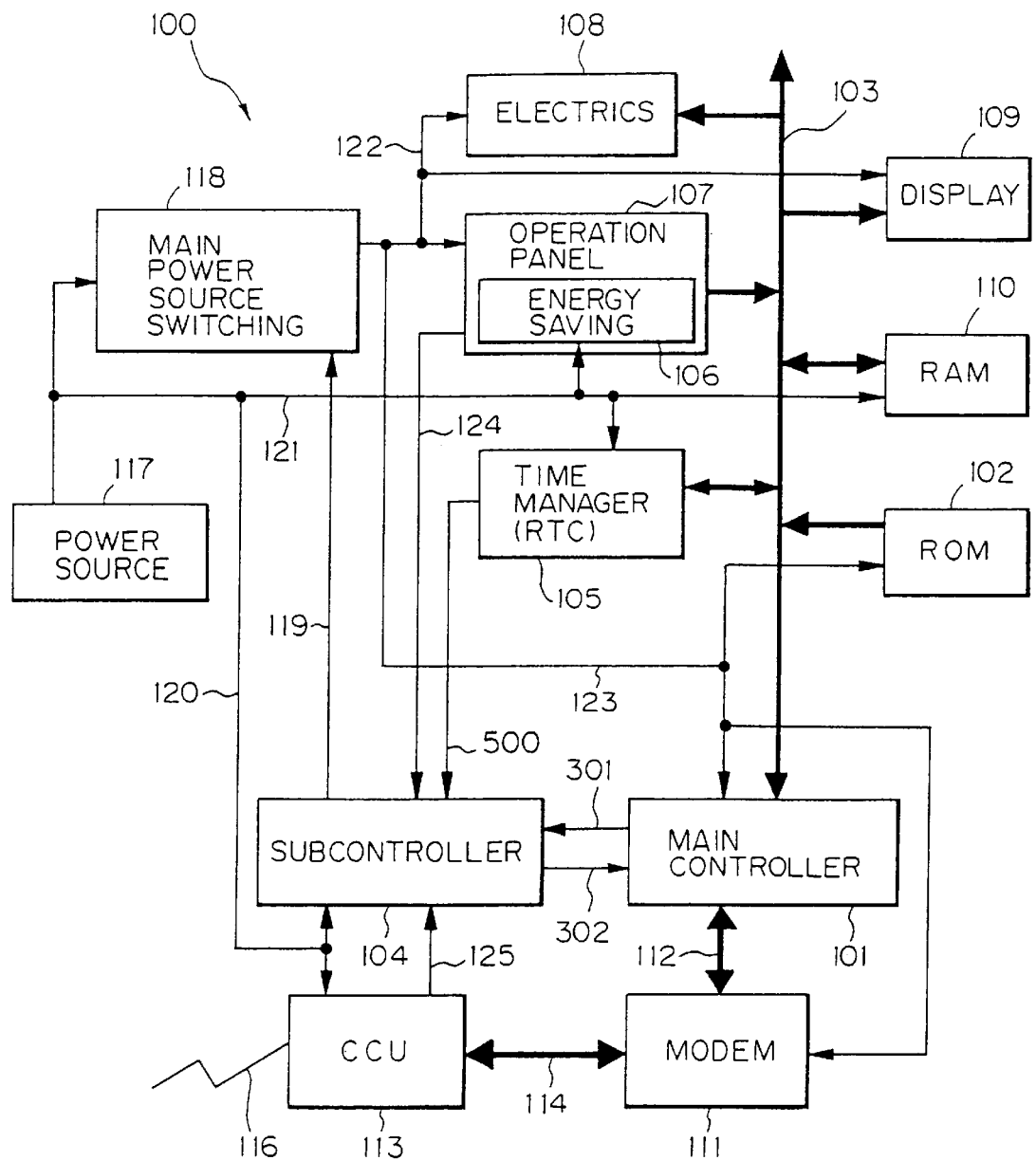
FIG. 5 is a schematic block diagram showing a third embodiment of the present invention.

Referring to FIG. 5, a third embodiment of the present invention will be described. in FIG. 5, blocks identical with the blocks shown in FIGS. 1 and 3 are designated by identical reference numerals, and a detailed description thereof will not be made in order to avoid redundancy. As shown, the time manager 105 and subcontroller 104 are interconnected by a time interrupt signal line 500. In this embodiment, the time manager 105 has a function of outputting a time interrupt signal at a period of, e.g., 1 minute or 1 second.

Figure 6A:
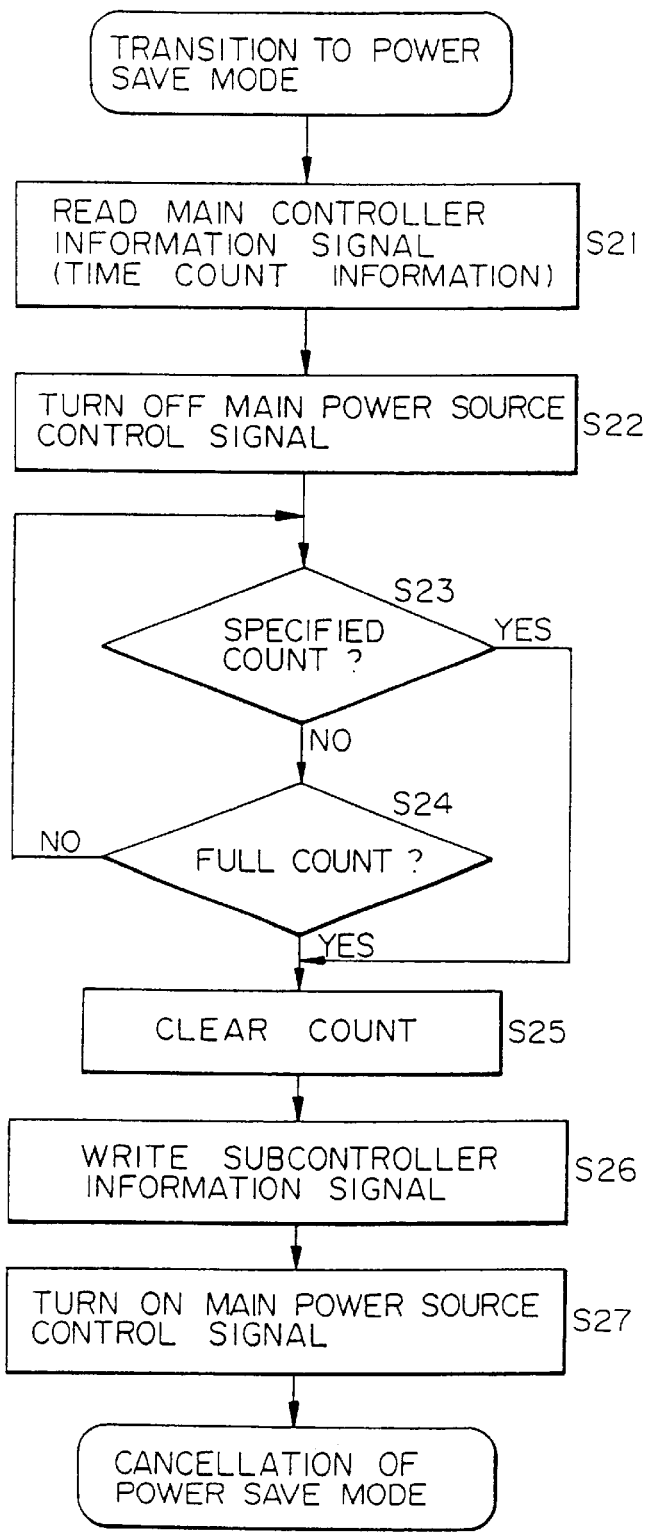
FIGS. 6A and 6B are flowcharts demonstrating a specific operation of the third embodiment.
Figure 6B:
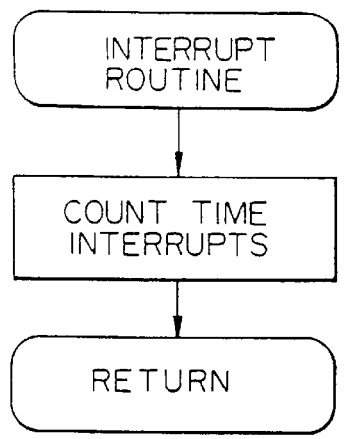

FIGS. 6A and 6B demonstrate a specific operation of the third embodiment to occur after the transition to the energy saving mode. As shown in FIG. 6A, on detecting the transition to the energy saving mode, the subcontroller 104 reads time count information out of the main controller information signal output from the main controller 101 (step S21). Again, the time count information refers to information showing in how many hours, minutes and seconds the energy saving mode should be cancelled. The main controller 101 or the subcontroller 104 determines the count on the basis of the time period clock output from the time manager 105.

After the subcontroller 104 has obtained the time count information from the main controller 101 in the step S21, it delivers the main power source control signal to the switching 118 via the signal line 119. In response, the switching 118 turns off the main power source (step S22), thereby setting up the energy saving mode.

In the energy saving mode, the subcontroller 104 repeats the loop consisting of steps S23 and S24. Of course, any other control may be effected during this period of time. Assume that the subcontroller 104 receives the time interrupt signal from the time manager 105 while repeating the above loop. Then, the subcontroller 104 jumps to a time interrupt routine shown in FIG. 6B. It is to be noted that the time interrupt signal refers to a time interrupt signal output from the time manager 105 every minute or every second. The period of the time interrupt signal, for example, is set by the main controller 101 via the bus line 103 before the energy saving mode operation begins.

As shown in FIG. 6B, in the interrupt routine, the subcontroller 104 counts the time interrupt signals input thereto (step S28), and then returns. In the step S23, the subcontroller 104 determines whether or not the count of the time interrupt signals is coincident with the time count information output from the main controller 101. If the answer of the stop S23 is No, the subcontroller 104 determines whether or not the count of the time period clock has reached the full count (step S24). If the count has not reached the full count (No, step S24), the subcontroller 104 returns to the step S23.

If the answer of the step S23 is Yes, the subcontroller 104 executes a step S25. Specifically, in this case, the subcontroller 104 is unable to count the next time period clock. Therefore, the subcontroller 104 once cancels the energy saving mode and reports the cancellation to the main controller 101 (step S25). The procedure to be executed when the count is coincident with the full count is the same as the procedure to be executed when the count of the timer interrupts is coincident with the time count information output from the main controller 101, as follows.

Assume that the count of the time interrupts is coincident with the time count information output from the main controller 101, as determined in the step S23. Then, the subcontroller 104 clears the count of the time interrupts in the step S25. Then, in a step S26, the subcontroller 104 delivers to the main controller 101 the subcontroller information signal including information showing the cause of the cancellation of the energy saving mode, e.g., whether the cancellation is based on the specified count output from the main controller 101 or whether it is based on the full count. The subcontroller information signal may additionally include information showing the time when the cancellation has occurred. Subsequently, the subcontroller 104 feeds the main power source control signal to the switching 118 via the signal line 119. In response, the switching 118 turns on the main power source and thereby cancels the energy saving mode (step S27).

Assume that the subcontroller 104 has cancelled the energy saving mode because the count of the time period clock has reached the full count. Then, the operation panel 107, electrics 108 and display 109 are not necessary for the operation of the apparatus 100. Therefore, the power supply to such units 107–109 may be continuously shut off. This decision is made by the main controller 101 on the basis of the subcontroller information signal output from the subcontroller 104.

When the subcontroller 104 has cancelled the energy saving mode due to the full count, the main controller 101 outputs new time count information in the form of the main controller information signal. The subcontroller 104 receives the new time count information and again sets up the energy saving mode. This is followed by the procedure described with reference to FIG. 6.

As stated above, in this embodiment, the subcontroller 104 counts the time interrupt signals output from the time manager 105, and compares the count of the time interrupt signals with time count information output from the main controller 101. Therefore, the functions needing time management can be controlled by a simple configuration. Further, the subcontroller 104 can manage time, and can therefore cancel the energy saving mode at a designated time on the basis of the count of the time interrupt signals and the content of the time count information.

Again, in the first embodiment, to obtain the time information output from the timer manager 105, the subcontroller 104 must be provided with a bus line including a data bus, address bus and control bus or a serial signal line, and a parallel or serial port to be connected to the bus line or the serial signal line. This is apt to scale up the construction of the apparatus 100. By contrast, this embodiment, like the second embodiment, is practicable without resorting to the bus line or the like, and therefore has a smaller size and saves power more than the first embodiment.

4th Embodiment

Figure 7:
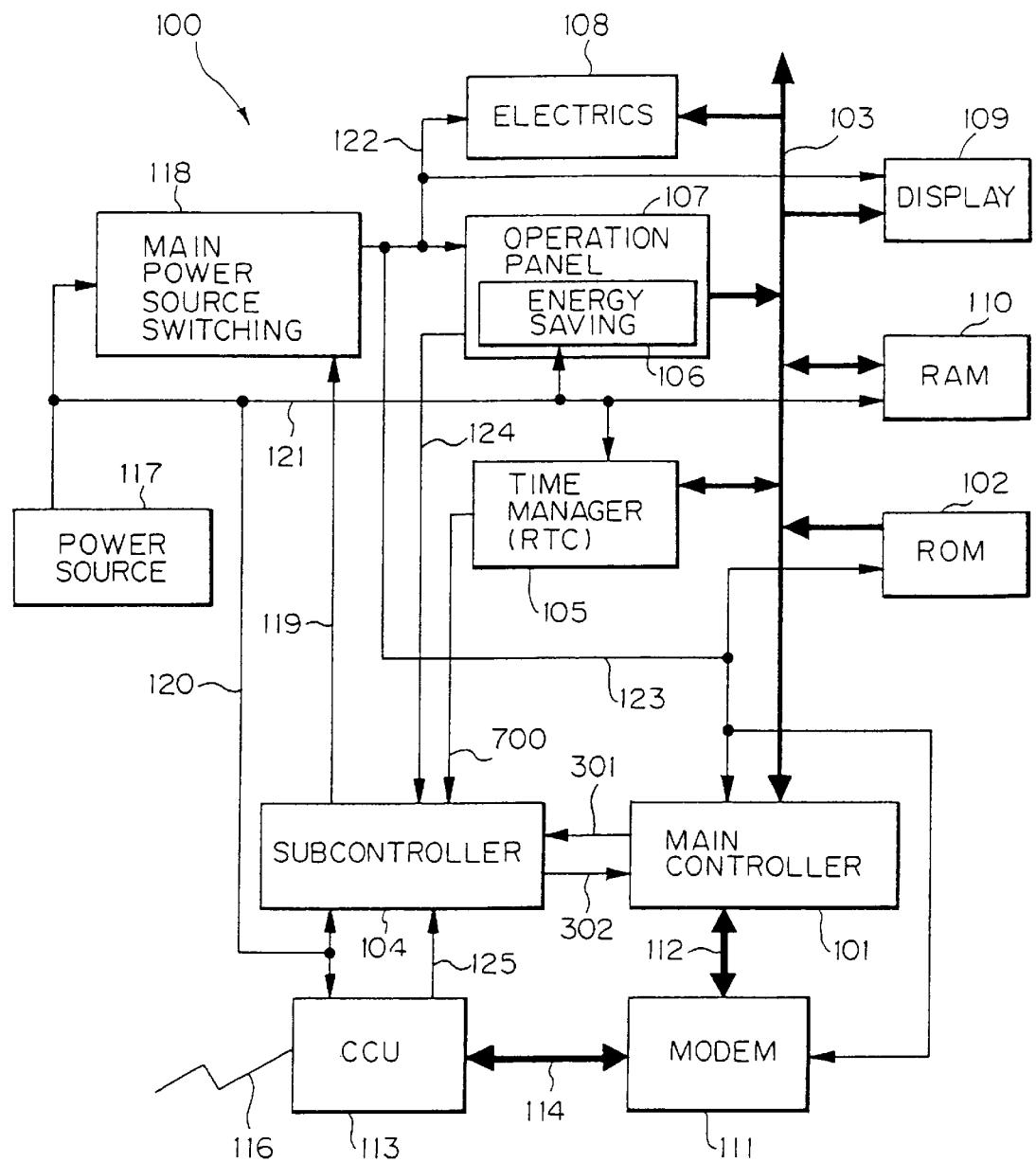
FIG. 7 is a schematic block diagram showing a fourth embodiment of the present invention.

Referring to FIG. 7, a fourth embodiment of the present invention will be described. In FIG. 7, blocks identical with the blocks shown in FIGS. 1, 3 and 5 are designated by identical reference numerals, and a detailed description thereof will not be made in order to avoid redundancy. As shown, the time manager 105 and subcontroller 104 are interconnected by a time interrupt signal line 700. In this embodiment, the time manager 105 has a function of outputting a time interrupt signal at a preselected time. The time when the time manager 105 outputs the time interrupt signal is set by the main controller 101 via the bus line 103. If the subcontroller 104 and time manager 105 are not connected by the bus line, then the subcontroller 104 may set the above time.

Figure 8:
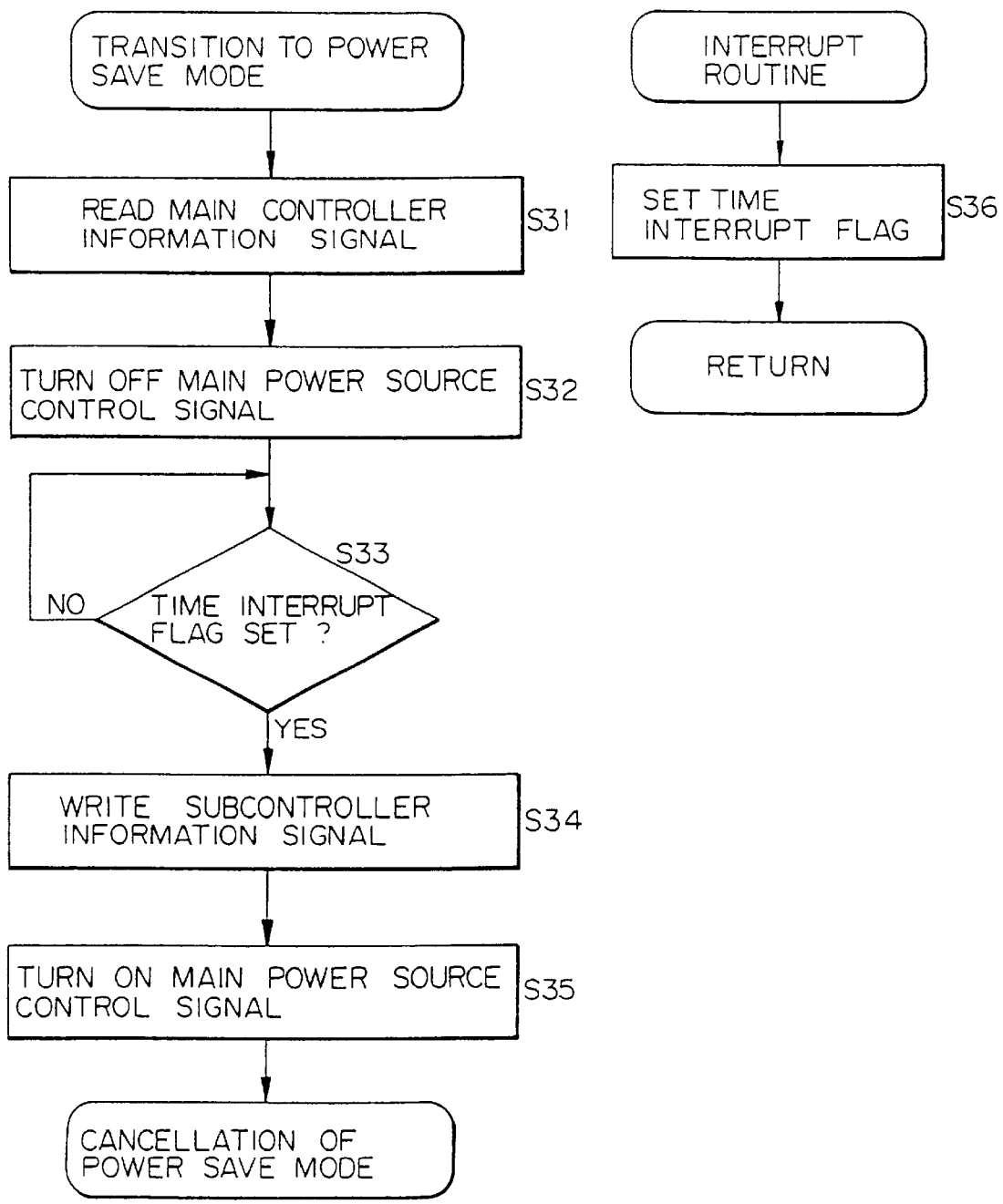
FIGS. 8A and 8B are flowcharts demonstrating a specific operation of the fourth embodiment.

FIGS. 8A and 8B demonstrate a specific operation of the fourth embodiment to occur after the transition to the energy saving mode. As shown in FIG. 8A, on detecting the transition to the energy saving mode, the subcontroller 104 receives the main controller information indicative of the content of control and output from the main controller (step S31). In response, the subcontroller 104 delivers the main power source control signal to the switching 118 via the signal line 119. In response, the switching 118 turns off the main power source (step S32), thereby setting up the energy saving mode.

In the energy saving mode, the subcontroller 104 repeats a step S33. Of course, any other control may be effected during this period of time. Assume that the subcontroller 104 receives the time interrupt signal from the time manager 105 while repeating the step S33. Then, the subcontroller 104 jumps to a time interrupt routine shown in FIG. 8B. In the time interrupt routine, the subcontroller 104 sets a time interrupt flag (step S36), and then returns. In the step S33, the subcontroller 104 determines whether or not the time interrupt flag has been set.

If the answer of the step S33 is No, the subcontroller 104 repeats the above steps. If the answer of the step S33 is Yes, the subcontroller 104 executes a step 34 for cancelling the energy saving mode. Specifically, in the step S34, the subcontroller 104 delivers to the main controller 101 the subcontroller information signal including information showing that the cancellation is based on the setting of the time interrupt flag. The subcontroller information signal may additionally include information showing the time of cancellation of the energy saving mode. Subsequently, the subcontroller 104 feeds the main power source control signal to the switching 118 via the signal line 119. In response, the switching 118 turns on the main power source and thereby cancels the energy saving mode (step S35).

As stated above, in this embodiment, the subcontroller 104 cancels the energy saving mode on the basis of the time interrupt signal output from the time manager 105. Therefore, the functions needing time management can be controlled by a simple configuration. Further, the subcontroller 104 can manage time, and can therefore cancel the energy saving mode at a designated time.

In the second and third embodiments, means for counting the time period clock or the time interrupt signal and the time count information output from the main controller 101 are essential. The fourth embodiment is practicable without resorting to such means or information, achieving a further simpler configuration.

Figure 9:
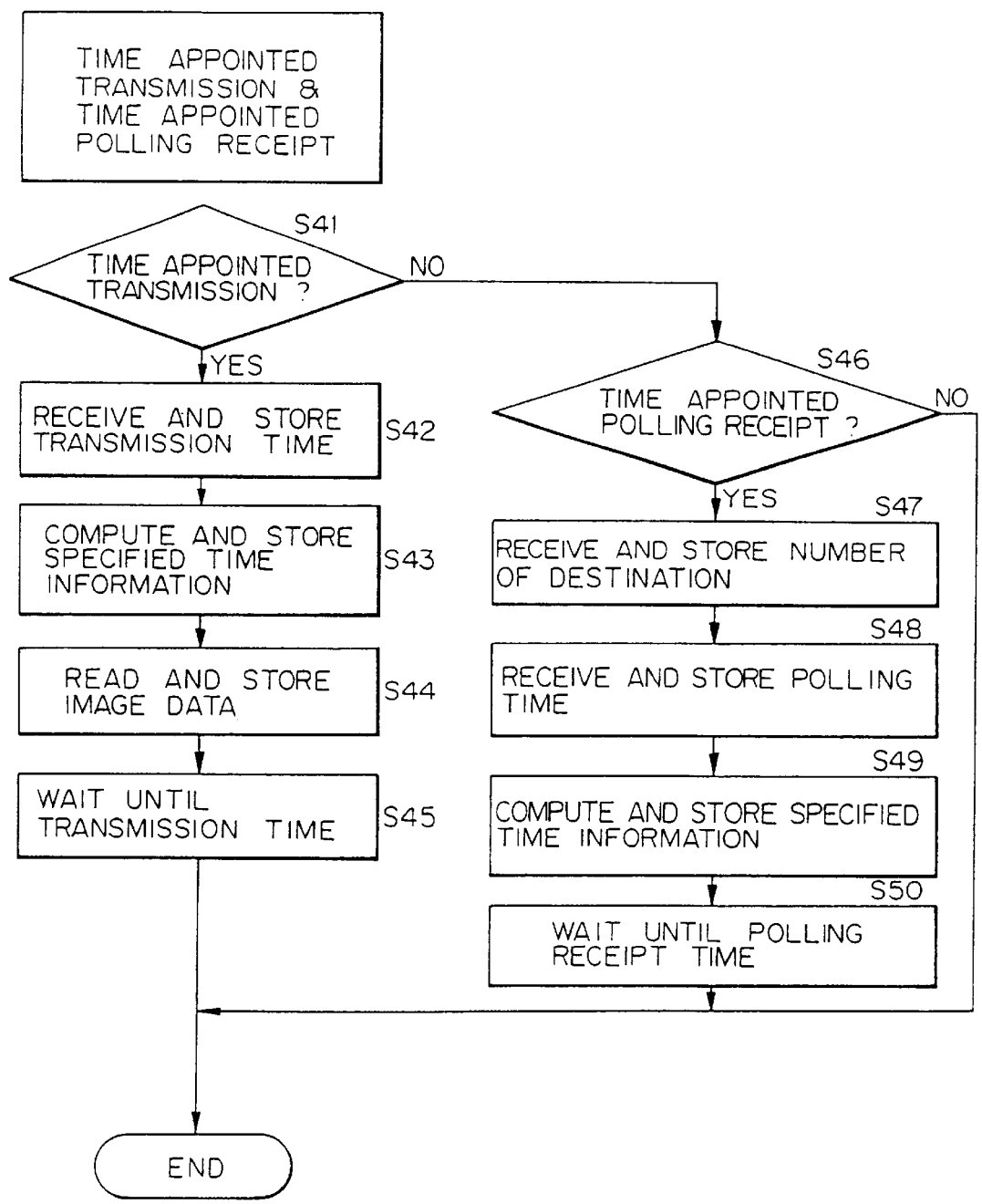
FIG. 9 is a flowchart representative of time appointed transmission and time appointed polling receipt practicable with any one of the first to fourth embodiments.

Reference will be made to FIG. 9 for describing how the first to fourth embodiments each performs time appointed transmission and time appointed polling receipt. As shown, assume that a time appointed transmission command is input on the operation panel 107 (Yes, step S41), and that a time for transmission is also input (step S42). Then, the main controller 101 writes the time for transmission in the RAM 110. Subsequently, the main controller 101 computes a time for cancelling the energy saving mode, and writes it in the RAM 110 as specified time information (step S43). For example, when the appointed time for transmission is 23.00, the main controller 101 computes a time 5 minutes earlier than the appointed time (22.55), and writes it in the RAM 110. Further, the interval between the cancellation of the energy saving mode and the appointed time for transmission may be set on the operation panel 107 by the operator in consideration of the preparation time, as desired. Thereafter, the main controller 101 reads image data out of a document, writes the image data in the RAM 110 in association with the time for transmission (step S44), and then waits for the time for transmission (step S45).

Assume that a time appointed polling receipt command is input on the operation panel 107 (No, step S41 and Yes, step S46). Then, the main controller 101 writes the number of the destination, i.e., a telephone number and an appointed polling time in the RAM 110 (steps S47 and S48). Subsequently, the main controller 101 computes a time for cancelling the energy saving mode, and writes it in the RAM 110 as specified time information (step S49). For example, when the appointed polling time for transmission is 20.00, the main controller 101 computes a time 5 minutes earlier than the appointed time (19.55), and writes it in the RAM 110. The interval between the cancellation of the energy saving mode and the appointed polling time may also be set on the operation panel 107 by the operator in consideration of the preparation time, as desired. Thereafter, the main controller 101 waits for the time for polling receipt (step S50).

In the time appointed transmission mode or the time appointed polling receipt mode, the main controller 101 determines at a preselected timing whether or not the transmitting time or the polling time has been reached. At the transmitting or polling time, the main controller 101 executes the corresponding operation. The specified time information is also available with the power save timer and night timer. In such a case, a wake-up time set by the operator will be directly written to the RAM 110 as the specified time information.

5th Embodiment

Figure 10:
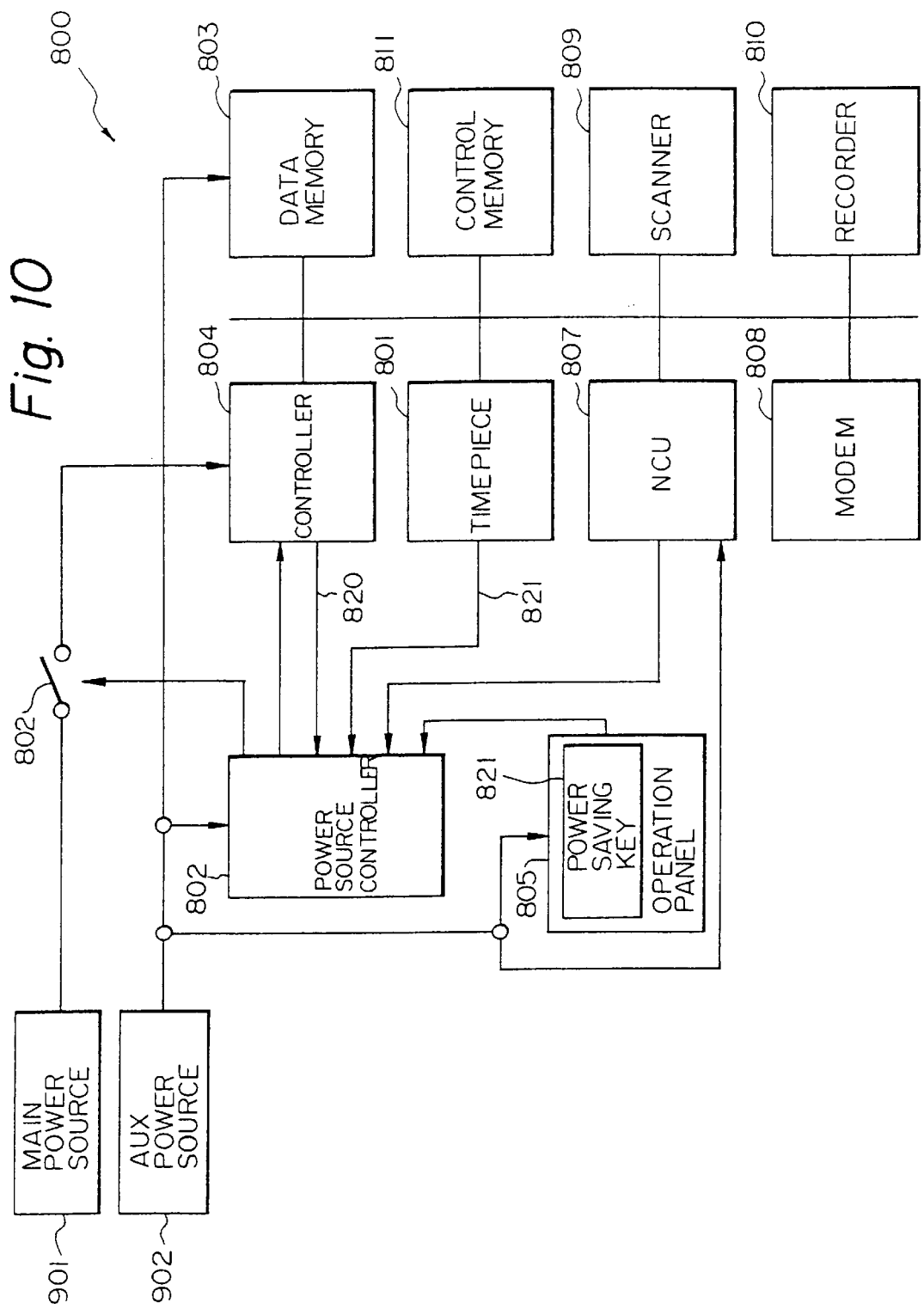
FIG. 10 is a schematic block diagram showing a fifth embodiment of the present invention.

Referring to FIG. 10, a fifth embodiment of the present invention is shown. As shown, a facsimile apparatus 800 includes a power source controller 802 for controlling the supply of power from a man power source 901 and an auxiliary power source 902 in response to the output of a timepiece 801 as well as the outputs of the other units. The timepiece 801 informs the power source controller 802 of the fact that an appointed time for, e.g., time appointed transmission has been reached. A data memory 804 stores image data to be sent or received image data. A controller 804 controls the entire apparatus 800 including the power source controller 802. An operation panel 805 is manipulated by the operator to enter various kinds of commands and data, while displaying messages meant for the operator. A main power source switch 806 selectively shuts off the supply of power from the main power source 901. A network control unit (NCU) 807 controls the connection of the apparatus 800 to a communication circuit. A modem 808 modulates image data to be sent or demodulates received image data. A scanner 809 reads image data out of a document. A recorder 810 prints received image information on paper. A control memory 811 stores various kinds of control data including the time for, e.g., time appointed transmission.

The controller 804 includes a CPU and a ROM storing a program and implements, e.g., specified time setting means for setting the above appointed time in the timepiece 801. When the commercially available power source is shut off, the timepiece 801 and control memory 811 are powered by a battery, not shown. This prevents the timepiece 801 from stopping counting time and prevents the control information stored in the control memory 811 from being lost.

Power is fed to the man power source 901 and auxiliary power source from the commercially available power source. When the main power source switch 806 connected to the power source 901 is closed (ON state), power is supplied to all the blocks of the apparatus 800 from the main power source 901. In FIG. 10, only the line for feeding power from the power source 901 to the controller 804 is shown. The auxiliary power source 902 feeds power only to the power source controller 802, data memory 803, a power save key 812 provided on the operation panel 805, and NCU 807. The data memory 803 is implemented as, e.g., a DRAM having a self-refreshing function.

Figure 11:
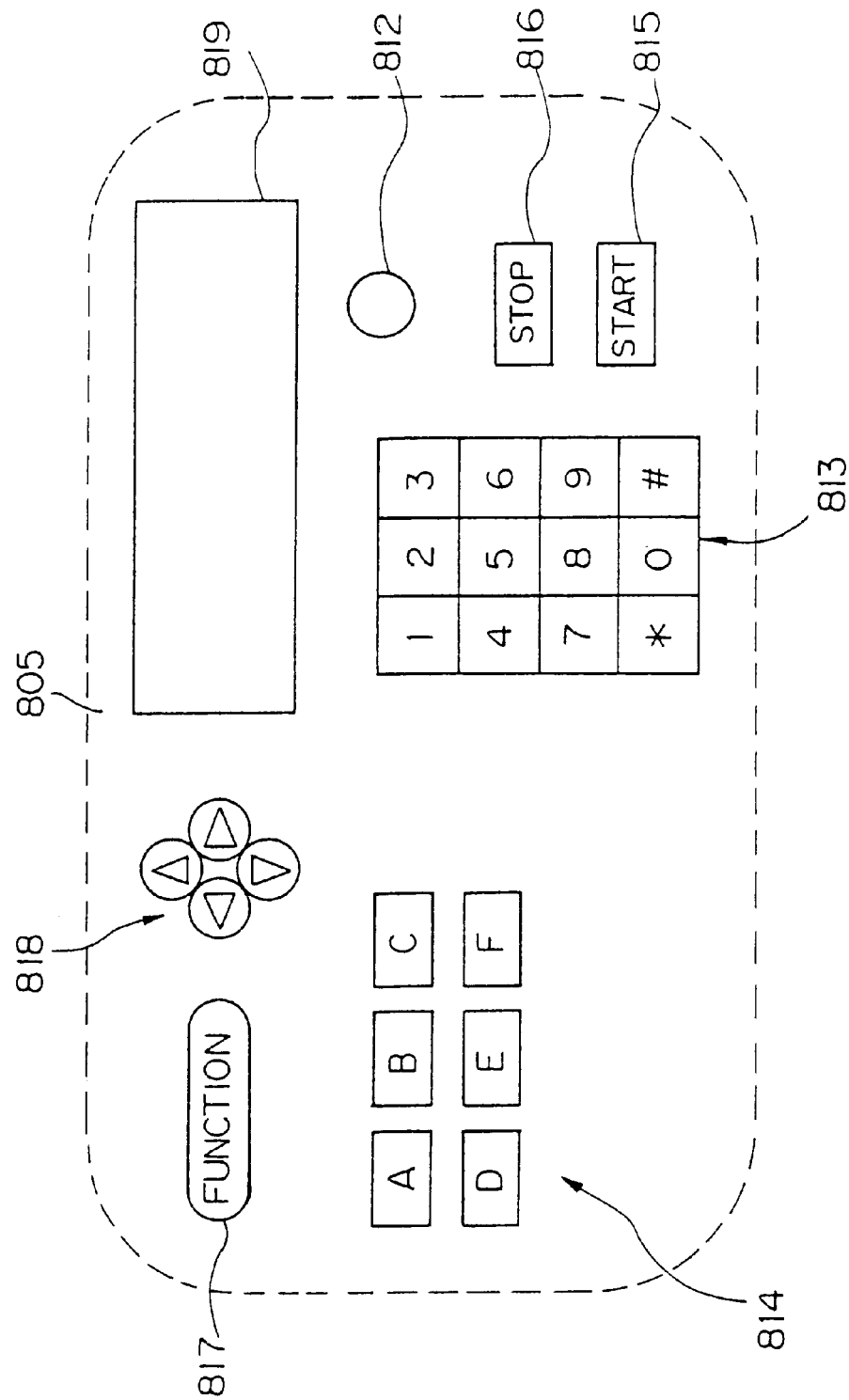
FIG. 11 is a plan view showing a specific arrangement of an operation panel included in the fifth embodiment.

FIG. 11 shows a specific arrangement of the operation panel 805. As shown, the operation panel 805 includes the power save key 812 for delivering a command to the power source controller 802, numeral keys 813 for inputting, e.g., the telephone number of the destination, speed call keys 814 accessible for designating a desired terminal number registered beforehand, a start key 815, a stop key 816, a function key 817, a cursor key 818, and a display 819.

Figure 12:
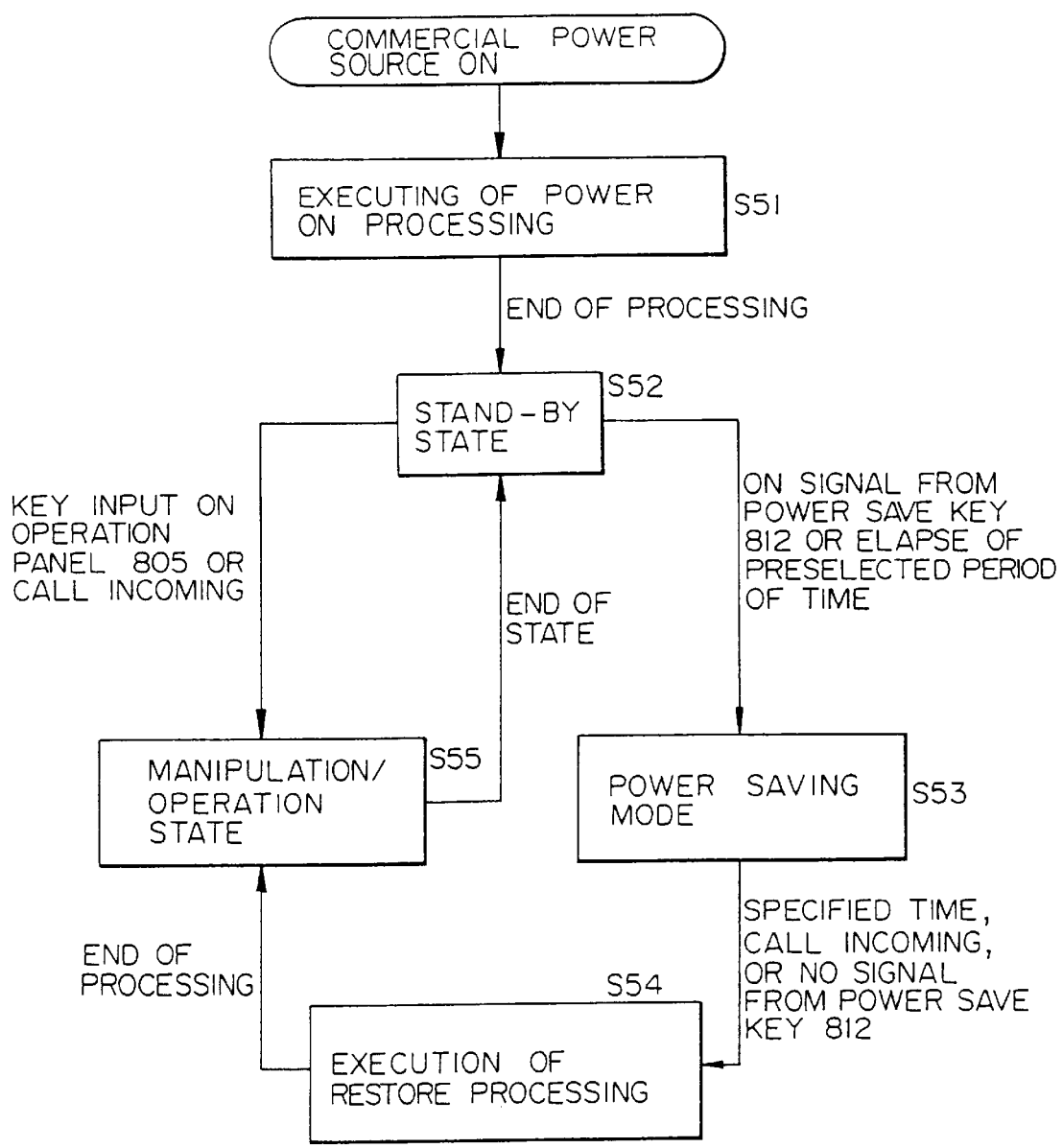
FIG. 12 shows the transition of the state of the fifth embodiment.
Figure 13:
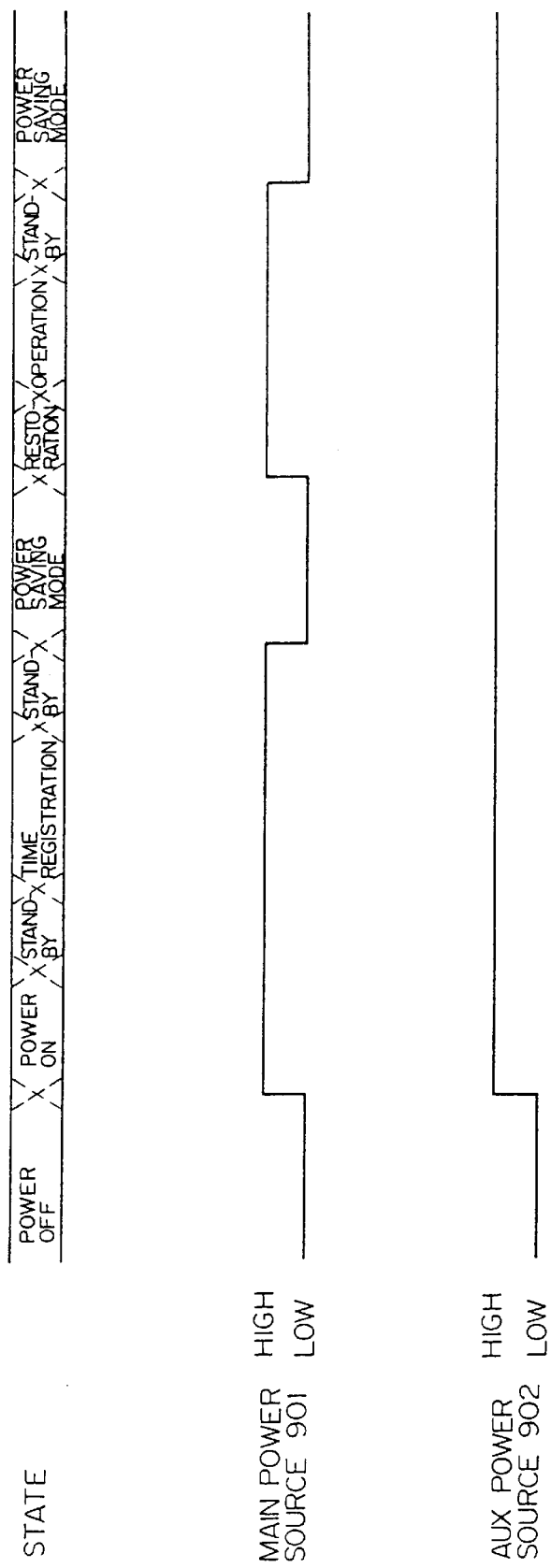
FIG. 13 is a timing chart demonstrating control over a main and an auxiliary power source included in the fifth embodiment.

FIG. 12 demonstrates the transition of the state of the above facsimile apparatus 800. FIG. 13 is a timing chart showing the control over the main power source 91 and auxiliary power source 902. A specific operation of the apparatus 800 will be described with reference to FIGS. 12 and 13. Assume that the commercial power source connected to the apparatus 800 is initially in its OFF state (POWER OFF, FIG. 13). Then, power is not fed to either the main power source 901 or the auxiliary power source 902 (LOW level, FIG. 13). When the commercial power source is turned on (POWER ON, FIG. 13), the auxiliary power source 902 is automatically turned on (HIGH level, FIG. 13). At the same time, the power source controller 802 turns on the power source switch 806 with the result that the main power source 901 is also turned on (HIGH level, FIG. 13).

The power ON processing executed by the controller 804 as stated above is represented by a step S51 in FIG. 12. The power ON processing includes various kinds of initialization and the clearing of the data memory 803. After this processing, the controller 804 enters a stand-by state (step S52). In the standby state, the controller 804 reads the current time out of the timepiece 801 while writing it in a preselected area of the control memory 811. Subsequently, the controller 804 obtains the current time periodically and determines whether or not a preselected period of time A stored in the control memory 811 beforehand has elapsed since the time written to the above area of the control memory 811 (step S52).

If the above period of time A has elapsed, the controller 804 delivers a sleep signal 820 to the power source controller 802, commanding the power saving mode. In response, the power source controller 802 turns off the main power source switch 806 in order to shut off the power supply from the main power source 901. As a result, the power saving mode or low power mode is set up (step S53). Assume that the controller 804 detects a key input on the operation panel 805 or detects an incoming call via the NCU 807 before the elapse of the period of time A. Then, the controller 804 enters a manipulation/operation state (step S55).

FIG. 13 shows a specific case wherein the operator manipulates the operation panel 805 for time appointed transmission before the period of time A expires. In this case, a time to be appointed for the transmission, the terminal number of the destination and so forth are input on the numeral keys 812. These information are written to a preselected area of the control memory 811 by appointed time setting means. Then, image data to be sent are output from the scanner 809 and written to the data memory 803. During this period of time, the main power source 901 continuously feeds power while the auxiliary power source 902 feeds power so long as the commercial power source is in its ON state.

The appointed time setting means determines whether or not any appointed time has already been set in the timepiece 801. If no appointed times are present in the timepiece 801, the appointed time written to the preselected area of the control memory 811 from the operation panel 805 is set in the timepiece 801. If a plurality of appointed times are present in the preselected area of the control memory 811, one of them later than, but closest to, the current time is set in the timepiece 801. Further, the appointed time set in the timepiece 801 is automatically cleared by the timepiece 801 when the current time coincides with the appointed time set in the timepiece 801.

After the above manipulation and operation, the controller 804 again enters the stand-by state (step S52, FIG. 12). On the elapse of the preselected period of time A, the controller 804 shuts off the power supply from the main power source 901 and sets up the power saving mode, as stated earlier (step S53). If desired, the power save key 812 on the operation panel 805 may be pressed (ON state) so as to set up the power saving mode forcibly.

In the embodiment, the controller 804 sets up the power saving mode unconditionally on the elapse of the period of time A while in the stand-by state, as stated above. Alternatively, the controller 804 may set it up only if the interval between the elapse of the preselected period of time and the next time appointed transmission is longer than a preselected period of time B. This can be done by obtaining the next time for time appointed transmission and the preselected period of time B from the control memory 811, and comparing the sum of the current time and period of time B with the next time for time appointed transmission.

While the power is not fed from the main power source 901, the timepiece 801 is powered by the battery mentioned earlier. Therefore, the timepiece 801 continuously operates even in the power saving mode or low power state, delivering an alarm signal 821 to the power source controller 802 at the specified time. In response, the power source controller 802 turns on the main power source switch 806 and thereby cause the main power source 901 start feeding power. Subsequently, the controller 804 executes restore processing (step S54). It is to be noted that the power source controller 802 is operable because it is powered by the auxiliary power source 902 even in the power saving mode.

After the restore processing, the controller 804 executes the time appointed transmission (step S55). Specifically, the controller 804 reads out of the control memory 811 the destination's terminal number for which the transmission of the appointed time substantially coincident with the current time is meant. After the controller 804 has originated a call meant for the destination, it obtains a file number corresponding to the destination (assigned at the time of storage of the image data in the data memory 803) from the control memory 811, reads the image data designated by the file number out of the data memory 803, and sends the image data to the destination. The image data are prevented from being lost because the data memory 803 is powered by the auxiliary power source 902 even in the power saving mode, as stated previously.

The power source controller 802 escapes from the power saving mode also when it detects an ON signal output from the power save key. 812. Specifically, the power source controller 802 enters the power saving mode on detecting the ON signal in a mode other than the power saving mode, but escapes from the power saving mode on detecting the ON signal in the power saving mode. This allows the operator desiring, e.g., transmission to restore the normal power mode (power supply from the main power source 901) forcibly by pressing the power save key 812.

Further, the power source controller 802 escapes the power saving mode in response to a signal output from the NCU 807 and representative of an incoming call. In this case, the controller 804 executes receipt processing after the restore processing.

After, e.g., the time appointed transmission, the controller 804 again sets up the stand-by state (step S52) and then sets up the power saving mode (step S53). If the next appointed time is present in the control memory 811 at the end of the above time appointed transmission, the controller 804 sets the appointed time in the timepiece 801.

While the illustrative embodiment has concentrated on the time appointed transmission, the appointed time may alternatively be, e.g., the time for switching a receipt mode or the time for switching a heater preheat mode. As to the receipt mode, i.e., facsimile/telephone mode, if the power saving mode is set at the time when a preselected time is reached, the power saving mode is replaced with the normal power mode in order to render the controller 804 operable; the controller 804 switches over the receipt mode. As to the heater preheat mode, the controller 804 turns on or turns off a heater including in the recorder 810 at a preselected time.

Further, the appointed time is not limited to a facsimile apparatus. For example, a power saving mode may be replaced with a normal power mode at a preselected time by a personal computer in order to, e.g., send an electronic mail.

The subcontroller 104 and time manager 105 included in each of the first to fourth embodiments will be described more specifically hereinafter. While the subcontroller 104 and time manager 105 may be implemented by software, they are assumed to be implemented by hardware in the following description.

Figure 14:
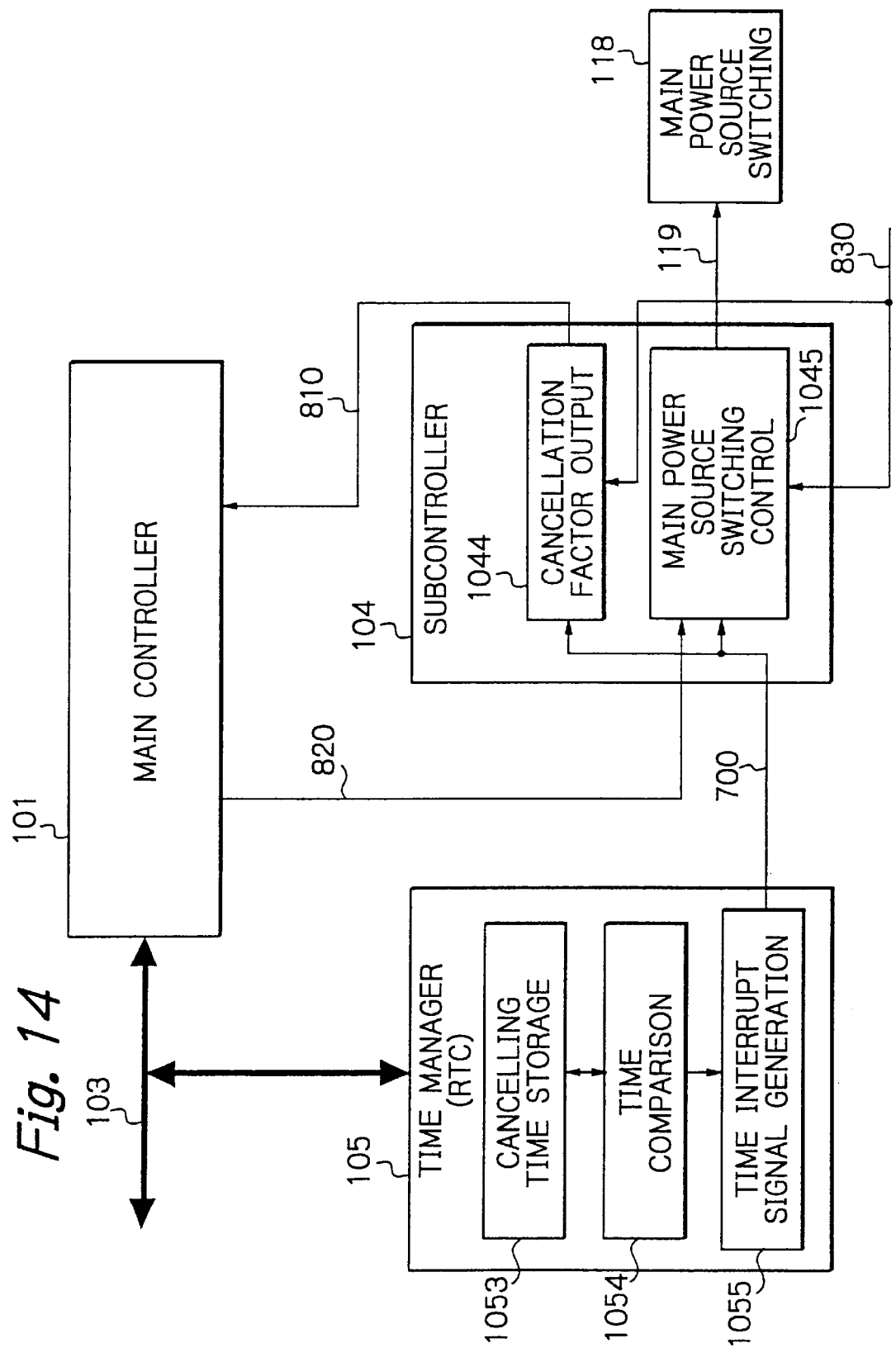
FIG. 14 is a schematic block diagram showing a specific configuration of a subcontroller and a specific configuration of a time manager included in the first and fourth embodiments described with reference to FIGS. 1 and 7, respectively.

FIG. 14 shows specific configurations of the subcontroller 104 and time manager 105 included in the first and fourth embodiments described with reference to FIGS. 1 and 7, respectively. When the subcontroller 104 is implemented by hardware, it is not necessary to connect the subcontroller 104 and time manager 105 by a bus or to use the bus transceiver 115, FIG. 1. Consequently, the first and fourth embodiments are identical as to the configurations of the subcontroller 104 and timer manager 105.

As shown in FIG. 14, the subcontroller 104 includes a cancellation factor output 1044 and a main power source switching control 1045. The time manager 105 includes a canceling time storage 1053, a time comparison 1054, and a time interrupt signal generation 1055. Before setting up the energy saving mode, the main controller 101 interchanges data with the time manager 105 via the bus 103 to thereby set a time for canceling the above mode in the canceling time storage 1053 of the time manager 105. Subsequently, the main controller 101 resets the main power source switching control 1045 by sending a signal 820 thereto. In response, the main power source switching control 1045 delivers a main power source control signal 119 to the main power source switching 118 for thereby turning off the switching 118. As a result, the energy saving mode is set up.

In the energy saving mode, the time comparison 1054 of the time manager 105 constantly compares the current time and the time set in the canceling time storage 1053. When the current time coincides with the set time, the time comparison 1054 feeds a command signal to the time interrupt signal generation 1055. In response, the time interrupt signal generation 1055 makes its output signal or time interrupt signal 700 active. When the time interrupt signal 700 or a ringing signal or any other cancellation factor signal 830 becomes active, the subcontroller 104 sets the main power source switching control 1045. The main power source switching control 1045, in turn, turns on the main power source switching 118 with the main power source control signal 119, thereby canceling the energy saving mode. At the same time, the cancellation factor output 1044 sends a particular signal 810 derived from each signal 830 representative of a particular cancellation factor to the main controller 101. On the turn-on of the main power source switching 118, the main controller 101 confirms the cancellation factor represented by the signal 810 and then executes an adequate procedure in accordance with the cancellation factor.

Figure 15:
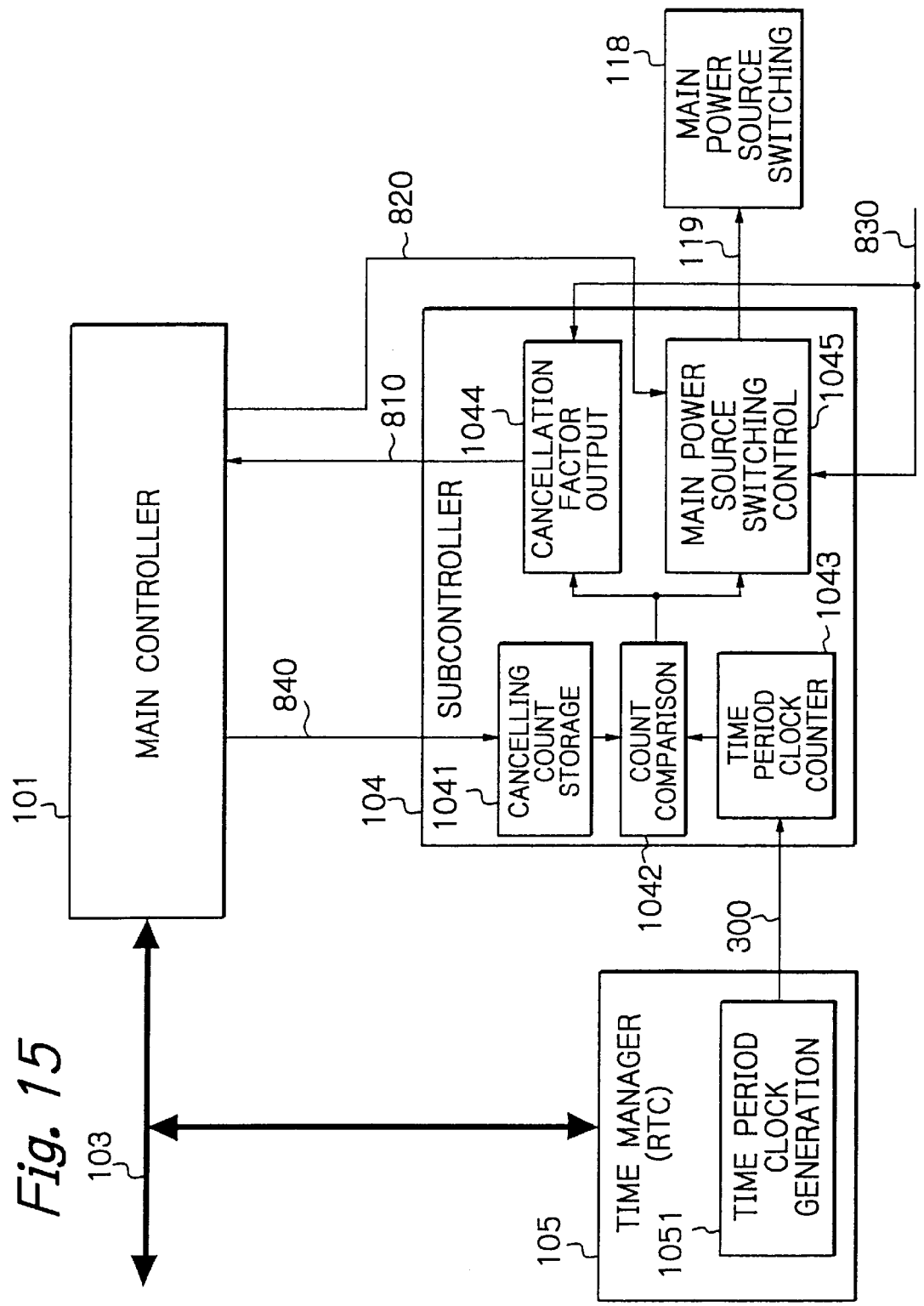
FIG. 15 is a schematic block diagram showing a specific configuration of a subcontroller and a specific configuration of a time manager included in the second embodiment described with reference to FIG. 3.

FIG. 15 shows a specific configurations of the subcontroller 104 and time manager 105 included in the second embodiment described with reference to FIG. 3. As shown, the subcontroller 104 includes the cancellation factor output 1044 and main power source switching control 1045 like the subcontroller 104 of FIG. 14. In FIG. 15, the subcontroller 104 additionally includes a canceling count storage 1041, a count comparison 1042, and a time period clock counter 1043. The time manager 105 includes a time period clock generation 1051. Before setting up the energy saving mode, the main controller 101 determines a time period count up to the time of cancellation of the energy saving mode by performing an inverse operation with the current time of the time manager 105, which is fed via the bus 105. The main controller 101 then sends a signal 840 to the canceling count storage 1041 in order to set the determined time period count in the storage 1041. Subsequently, the main controller 101 resets the main power source switching control 1045 by sending the signal 820 thereto. In response, the main power source switching control 1045 delivers the main power source control signal 118 to the main power source switching 118 for thereby turning off the switching 118. As a result, the energy saving mode is set up.

In the energy saving mode, the time manager 105 causes its time period clock generation 1051 to generate a time period clock 300 having a time period of, e.g., 1 minute or 1 second. The time period clock 300 is input to the time period clock counter 1043 of the subcontroller 104. The time period clock counter 1043 counts the input clock 300. The count comparison 1042 constantly compares the count stored in the cancellation count storage 1041 and the current count of the time-period clock counter 1043. When the current count coincides with the set count, the count comparison 1054 feeds an active signal to each of the cancellation factor output 1044 and main power source switching control 1045. When the output signal of the count comparison 1054 or a ringing signal or any other cancellation factor signal 830 becomes active, the subcontroller 104 sets the main power source switching control 1045. As a result, the main power source switching control 1045 turns on the main power source switching 118 with the main power source control signal 119, thereby canceling the energy saving mode. At the same time, the cancellation factor output 1044 sends a particular signal 810 derived from each signal 830 representative of a particular cancellation factor to the main controller 101. Again, on the turn-on of the main power source switching 118, the main controller 101 confirms the cancellation factor represented by the signal 810 and then executes an adequate procedure in accordance with the cancellation factor.

Figure 16:
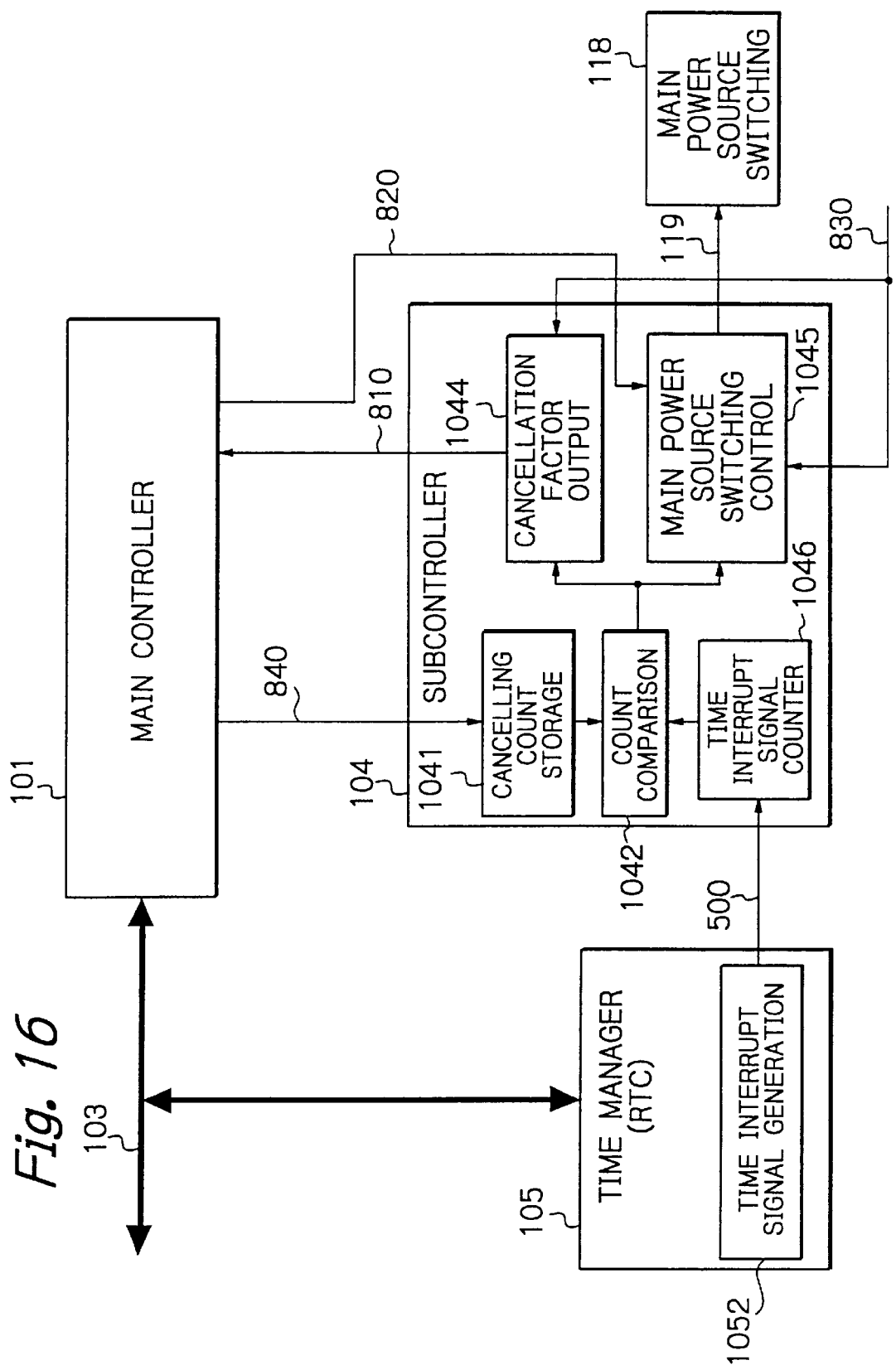
FIG. 16 is a schematic block diagram showing a specific configuration of a subcontroller and a specific configuration of a time manager included in the third embodiment described with reference to FIG. 5.

FIG. 16 shows a specific configurations of the subcontroller 104 and time manager 105 included in the third embodiment described with reference to FIG. 5. As shown, the configuration of FIG. 16 is identical with the configuration of FIG. 15 except that the subcontroller 104 includes a time interrupt signal counter 1043 in place of the time period signal counter 1043, and that the time manager 105 includes a time interrupt signal generation 1052 in place of the time period clock generation 1041. In FIG. 16, when the energy save mode is set up by exactly the same procedure as described with reference to FIG. 15, the time interrupt signal generation 1052 of the time manager 105 generates a time interrupt signal 500 having a time period of, e.g., 1 minute or 1 second and feeds it to the time interrupt signal counter 1046. The time interrupt signal counter 1046 counts the input time interrupt signal clock 500. The count comparison 1042 constantly compares the count of the counter 1046 and the count set in the cancellation count storage 1041. After the current count and set count have coincided with each other, the circuitry of FIG. 16 executes the procedure described with reference to FIG. 15 in exactly the same manner.

As stated above, in the illustrative embodiment, power supply from the main power source is shut off until a preselected time for executing a preselected operation. When the preselected time is reached, the power supply from the main power source begins. This implements power saving control with a data terminal of the type starting a preselected operation at an appointed time. This is also true even when the preselected operation is time appointed transmission.

In the embodiment, if the next operation does not start even after the elapse of the preselected period of time A since the end of the preselected operation, and if the period of time up to the next appointed time is longer than the preselected period of time B, the power supply from the main power source is again interrupted. This reduces the ON/OFF frequency of the main power source switch and thereby enhances the reliability of the switch. In addition, the power supply from the main power source to the data memory can be interrupted, further enhancing the power saving effect.

Furthermore, when the subcontroller is implemented by hardware, it does not need a CPU, a ROM or a RAM and therefore promotes the cost reduction and further power saving of the communication terminal. Moreover, the hardware scheme facilitates ASIC (Application Specific Integrated Circuit) fabrication and even allows the subcontroller to be configured integrally with, e.g., the main controller and time manager in the form of a single chip.

Various modifications will become possible for those skilled in the art after receiving the teachings of the present disclosure without departing from the scope thereof.

What is claimed is:

1. A communication terminal including an energy saving function, comprising:

main control means for controlling said communication terminal in its entirety when power is fed from a main power source to said main control means;

auxiliary control means operating when said communication terminal is in a stand-by state for managing conditions of said communication terminal requiring time management when said power is fed to said auxiliary control means instead of to said main control means; and time managing means for managing, while said auxiliary control means is in operation, a period of time elapsed in said stand-by state of said communication terminal and for feeding time information to said auxiliary control means, wherein said main control means feeds, before said communication terminal enters said stand-by state, a specified cancelling time for cancelling said stand-by state to said auxiliary control means, and said auxiliary control means compares, in said stand-by state, said time information and said specified cancelling time and cancels, when said specified cancelling time is reached, said stand-by state for starting power supply to said main control means and a plurality of preselected units.

2. The communication terminal as recited in claim 1, wherein said time information comprises a time period clock output from said time managing means at a plurality of predetermined intervals, said main control means outputs said specified canceling time in a form of a cancellation count of said time period clock to be counted up to a cancellation of said stand-by state, and said auxiliary control means counts said time period clock and cancels said stand-by state when a count of said time period clock coincides with said cancellation count.

3. The communication terminal as recited in claim 2, wherein said auxiliary control means feeds, when canceling said stand-by state, a time and a cause of cancellation to said main control means.

4. The communication terminal as recited in claim 2, wherein said auxiliary control means cancels, when one of said count of said time period clock and a count of time interrupt signals reaches a full count, said stand-by state, feeds information indicative of said full count to said main control means, receives a new cancellation count from said main control means, enters said stand-by state, and counts one of said time period clock and said time interrupt signal.

5. The communication terminal as recited in claim 1, wherein said time information comprises time interrupt signals output from said time managing means at a plurality of predetermined intervals, said main control means outputs said stand-by canceling time in a form of a cancellation count of said time interrupt signals to be counted up to a cancellation of said stand-by state and said auxiliary control means counts said time interrupt signals and cancels said stand-by state when a count of said time interrupt signal coincides with said cancellation count.

6. The communication terminal as recited in claim 1, wherein said auxiliary control means is implemented by hardware.

7. The communication terminal as recited in claim 1, wherein said time information comprises time interrupt signals output from said time managing means at a plurality of predetermined intervals, said main control means outputs said specified cancelling time in a form of a cancellation count of said time interrupt signals to be counted up to a cancellation of said stand-by state, and said auxiliary control means counts said time interrupt signals and cancels said stand-by state when a count of said time interrupt signals coincides with said cancellation count.

8. A communication terminal including an energy saving function, comprising:

main control means for controlling said communication terminal in its entirety when power is fed from a main power source to said main control means;

auxiliary control means operating when said communication terminal is in a stand-by state for managing conditions of said communication terminal requiring time management when said power is fed to said auxiliary control means instead of to said main control means; and time managing means for managing, while said auxiliary control means is in operation, a period of time elapsed in said stand-by state of said communication terminal and for feeding time information to said auxiliary control means, wherein said main control means feeds, before said communication terminal enters said stand-by state, a specified cancelling time for cancelling said stand-by state to said auxiliary control means, said auxiliary control means compares, in said stand-by state, said time information and said specified cancelling time and cancels, when said specified cancelling time is reached, said stand-by state for starting power supply to said main control means and a plurality of preselected units, said time information comprises time interrupt signals output from said time managing means at a plurality of predetermined intervals, said main control means outputs said specified cancelling time in a form of a cancellation count of said time interrupt signals to be counted up to a cancellation of said stand-by state, said auxiliary control means counts said time interrupt signals and cancels said stand-by state when a count of said time interrupt signals coincides with said cancellation count, and said auxiliary control means comprises:

a main power source switching circuit reset, before an energy saving mode is set up, by said main control means to thereby switch said main power source for said energy saving mode; and a cancellation factor outputting circuit for switching, in the energy saving mode, said main power source in response to said time interrupt signal and a cancellation factor signal, which is representative of a factor based on which said stand-by state is cancelled, to thereby cancel said energy saving mode.

9. The communication terminal as recited in claim 8, wherein said time managing means comprises:

a cancellation period of time storage for storing a specified time at which the energy saving mode should be cancelled;

a time comparing means for comparing said specified time and a current time to thereby determine whether or not said specific time and said current time are coincident; and a time interrupt signal generating circuit for generating said time interrupt signal when the specified time and the current time are coincident.

10. A communication terminal including an energy saving function, comprising:

main control means for controlling said communication terminal in its entirety when power is fed from a main power source to said main control means;

auxiliary control means operating when said communication terminal is in a stand-by state for managing conditions of said communication terminal requiring time management when said power is fed to said auxiliary control means instead of to said main control means; and time managing means for managing, while said auxiliary control means is in operation, a period of time elapsed in said stand-by state of said communication terminal and for feeding time information to said auxiliary control means, wherein said main control means feeds, before said communication terminal enters said stand-by state, a specified cancelling time for cancelling said stand-by state to said auxiliary control means, said auxiliary control means compares, in said stand-by state, said time information and said specified cancelling time and cancels, when said specified cancelling time is reached, said stand-by state for starting power supply to said main control means and a plurality of preselected units, said time information comprises time interrupt signals output from said time managing means at a plurality of predetermined intervals, said main control means outputs said specified cancelling time in a form of a cancellation count of said time interrupt signals to be counted up to a cancellation of said stand-by state, said auxiliary control means counts said time interrupt signals and cancels said stand-by state when a count of said time interrupt signals coincides with said cancellation count, and said auxiliary control means comprises:

a main power source switching circuit reset, before an energy saving mode is set up, by said main control means to thereby switch said main power source for said energy saving mode;

a time interrupt signal counter for counting said time interrupt signals in a power saving mode;

a cancellation count storage for storing a count of said time interrupt signals up to a cancellation of the energy saving mode;

a count comparing circuit for comparing a count of said time interrupt signal counter and the count stored in said cancellation count storage; and a cancellation factor outputting circuit for switching, when said counts are coincident, said main power source in response to a cancellation factor signal, which is representative of a factor based on which said stand-by state is cancelled, to thereby cancel said energy saving mode.

11. The communication terminal as claimed in claim 10, wherein said time managing means comprises a time interrupt signal generating circuit for generating said time interrupt signals.

12. A communication terminal including an energy saving function, comprising:

main control means for controlling said communication terminal in its entirety when power is fed from a main power source to said main control means;

auxiliary control means operating when said communication terminal is in a stand-by state for managing conditions of said communication terminal requiring time management when said power is fed to said auxiliary control means instead of to said main control means; and time managing means for managing, while said auxiliary control means is in operation, a period of time elapsed in said stand-by state of said communication terminal and for feeding time information to said auxiliary control means, wherein said auxiliary control means comprises:

a main power source switching circuit reset, before an energy saving mode is set up, by said main control means to thereby switch said main power source for said energy saving mode;

a time period clock counter for counting said time period clock in the energy saving mode;

a cancellation count storage for storing a count of said time interrupt signals up to a cancellation of the energy saving mode;

a count comparing circuit for comparing a count of said time interrupt signal counter and the count stored in said cancellation count storage; and a cancellation factor outputting circuit for switching, when said counts are coincident, said main power source in response to a cancellation factor signal, which is representative of a factor based on which said stand-by state is cancelled, to thereby cancel said energy saving mode.

13. The communication terminal as claimed in claim 12, wherein said time managing means comprises a time interrupt signal generating circuit for generating said time interrupt signals.

14. A communication terminal including an energy saving function, comprising:

a main controller for controlling said communication terminal in its entirety when power is fed from a main power source to said main controller;

an auxiliary controller operating when said communication terminal is in a stand-by state for managing conditions of said communication terminal requiring time management when said power is fed to said auxiliary controller unit instead of to said main controller; and a time managing unit for managing, while said auxiliary controller is in operation, a period of time elapsed in said stand-by state of said communication terminal and for feeding time information to said auxiliary controller, wherein said main controller feeds, before said communication terminal enters said stand-by state, a specified cancelling time for cancelling said stand-by state to said auxiliary controller, and said auxiliary controller compares, in said stand-by state, said time information and said specified cancelling time and cancels, when said specified cancelling time is reached, said stand-by state for starting power supply to said main controller and a plurality of preselected units.

15. A method of operating a communication terminal including an energy saving function, comprising:

controlling said communication terminal in its entirety when power is fed from a main power source to said main controller;

operating an auxiliary controller when said communication terminal is in a stand-by state for managing conditions of said communication terminal requiring time management when said power is fed to said auxiliary controller instead of to a main controller; and managing, while said auxiliary controller is in operation, a period of time elapsed in said stand-by state of said communication terminal and for feeding time information to said auxiliary controller, wherein said main controller feeds, before said communication terminal enters said stand-by state, a specified cancelling time for cancelling said stand-by state to said auxiliary controller, and said auxiliary controller compares, in said stand-by state, said time information and said specified cancelling time and cancels, when said specified cancelling time is reached, said stand-by state for starting power supply to said main controller and a plurality of preselected units.

* * * * *